(12) United States Patent
Zhan et al.

(10) Patent No.: US 11,805,296 B2
(45) Date of Patent: Oct. 31, 2023

(54) PER-VIEWER ENGAGEMENT-BASED VIDEO OPTIMIZATION

(71) Applicant: Conviva Inc., Foster City, CA (US)

(72) Inventors: Jibin Zhan, Foster City, CA (US); Weijia Li, Foster City, CA (US); Ming Liu, Foster City, CA (US); Saiguang Che, Belmont, CA (US); Aditya Ravikumar Ganjam, San Francisco, CA (US)

(73) Assignee: Conviva Inc., Foster City, CA (US)

( * ) Notice: Subject to any disclaimer, the term of this patent is extended or adjusted under 35 U.S.C. 154(b) by 105 days.

(21) Appl. No.: 16/900,773

(22) Filed: Jun. 12, 2020

(65) Prior Publication Data

US 2020/0314497 A1 Oct. 1, 2020

Related U.S. Application Data

(63) Continuation of application No. 14/958,621, filed on Dec. 3, 2015, now Pat. No. 10,735,815.

(60) Provisional application No. 62/089,160, filed on Dec. 8, 2014.

(51) Int. Cl.
*H04N 21/466* (2011.01)
*H04N 21/25* (2011.01)
*H04N 21/258* (2011.01)
*H04N 21/45* (2011.01)

(52) U.S. Cl.
CPC ....... *H04N 21/4666* (2013.01); *H04N 21/251* (2013.01); *H04N 21/25891* (2013.01); *H04N 21/4532* (2013.01)

(58) Field of Classification Search
CPC ............. H04N 21/4666; H04N 21/251; H04N 21/25891; H04N 21/4532; H04N 21/2385; H04N 21/2402; H04N 21/2408
See application file for complete search history.

(56) References Cited

U.S. PATENT DOCUMENTS

| 8,489,923 B1 | 7/2013 | Lakshminarayanan |
| 9,451,306 B2 | 9/2016 | Sarukkai |
| 9,578,074 B2 | 2/2017 | Kalman |

(Continued)

OTHER PUBLICATIONS

Krishnan et al. Understanding the effectiveness of video ads: A measurement study. Proceedings of the ACM SIGCOMM Internet Measurement Conference, IMC. 149-162. 10.1145/2504730.2504748. (Year: 2013).

(Continued)

*Primary Examiner* — Robert J Hance
*Assistant Examiner* — Akshay Doshi
(74) *Attorney, Agent, or Firm* — Van Pelt, Yi & James LLP

(57) ABSTRACT

Per-viewer engagement-based video optimization is disclosed. A request for content associated with a first client is received. A model associated with the first client is obtained. The obtained model comprises at least one of behavior and playback preferences of a viewer associated with the first client. The obtained model is used to determine, for the first client, an optimal set of instructions usable to obtain content. A different set of instructions is determined to be optimal for a second client. The optimal set of instructions determined for the client is provided as output. The first client is configured to obtain content according to the optimal set of instructions determined for the first client.

19 Claims, 11 Drawing Sheets

(56) References Cited

U.S. PATENT DOCUMENTS

| | | |
|---|---|---|
| 2006/0136597 A1 | 6/2006 | Shabtai |
| 2007/0201500 A1 | 8/2007 | Deshpande |
| 2010/0005046 A1* | 1/2010 | Segel .................. H04L 67/2847 |
| | | 706/46 |
| 2012/0278496 A1 | 11/2012 | Hsu |
| 2013/0263179 A1 | 10/2013 | Dow |
| 2014/0278308 A1 | 9/2014 | Liu |
| 2014/0351840 A1 | 11/2014 | Andrade |
| 2014/0380347 A1 | 12/2014 | Naveh |
| 2015/0032899 A1 | 1/2015 | Willars |
| 2016/0026920 A1 | 1/2016 | Sullivan |
| 2016/0100221 A1* | 4/2016 | Hiltch .................. H04N 21/812 |
| | | 725/14 |
| 2016/0140618 A1* | 5/2016 | Duggal ............... G06Q 30/0269 |
| | | 705/14.66 |

OTHER PUBLICATIONS

Krishnan et al. Video Stream Quality Impacts Viewer Behavior: Inferring Causality Using Quasi-Experimental Designs. IMC '12: Proceedings of the 2012 Internet Measurement Conference. Nov. 2012 pp. 211-224.

* cited by examiner

PER-VIEWER ENGAGEMENT-BASED VIDEO OPTIMIZATION

CROSS REFERENCE TO OTHER APPLICATIONS

This application is a continuation of co-pending U.S. patent application Ser. No. 14/958,621, entitled PER-VIEWER ENGAGEMENT-BASED VIDEO OPTIMIZATION filed Dec. 3, 2015 which is incorporated herein by reference for all purposes, which claims priority to U.S. Provisional Application No. 62/089,160, entitled PER VIEWER ENGAGEMENT BASED VIDEO OPTIMIZATION filed Dec. 8, 2014 which is incorporated herein by reference for all purposes.

BACKGROUND OF THE INVENTION

Video streaming quality is a complex measurement including many aspects, such as fast start up, high resolution, and smoothness of playback. The various aspects of video streaming quality are also inter-dependent and affected by many factors. With numerous different viewers using various types of clients to stream, optimizing the viewing experience for those viewers can be difficult.

BRIEF DESCRIPTION OF THE DRAWINGS

Various embodiments of the invention are disclosed in the following detailed description and the accompanying drawings.

DETAILED DESCRIPTION

Figure 1:
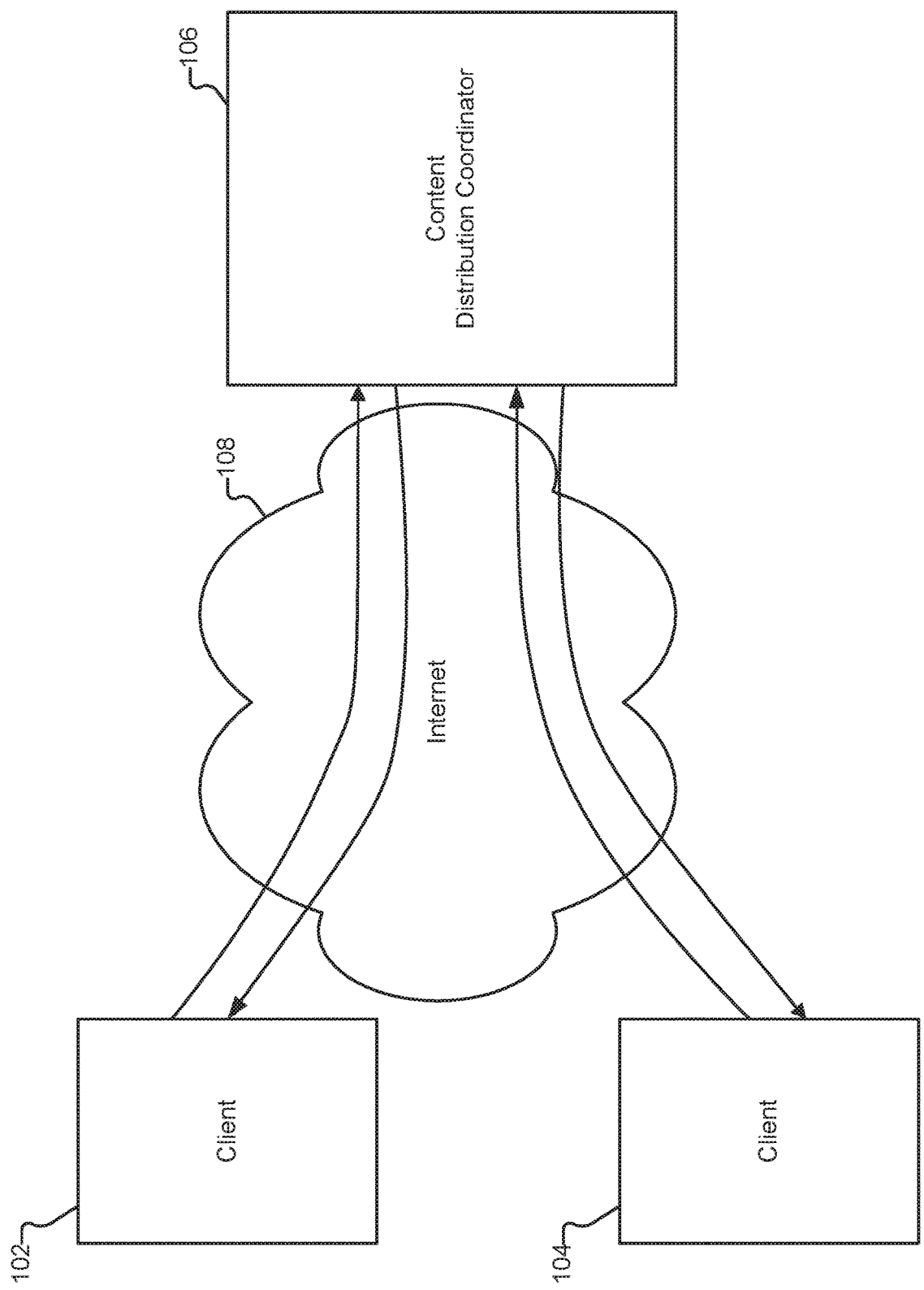
FIG. 1 illustrates an example embodiment of an environment in which per-viewer engagement-based video optimization is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When viewing content, different viewers may have different preferences with respect to what, for them, is a good quality experience that will keep them engaged. For example, some viewers may dislike buffering and tolerate low resolution streaming so long as they do not have to wait, while other viewers may prefer high quality (e.g., high resolution) and be willing to accept some buffering. The same viewer may even have different preferences for different types of content. For example, the viewer may dislike buffering when watching live sports, while preferring high resolution when watching movies.

Described herein are techniques for performing per-viewer engagement-based video optimization. Using the techniques described herein, individual preferences and behaviors of viewers can be learned/modeled to provide personalized, per-client optimization of content delivery. By performing such personalized optimization, viewer engagement can be improved. For example, depending on the content type, per-viewer preferences, video experience, etc., different instructions can be provided that are determined to be optimal for maximizing a particular viewer's engagement.

While example embodiments in a video streaming (e.g., live and on-demand streaming) ecosystem are described below, the techniques described herein can variously be adapted to accommodate any type of multimedia/audiovisual content distribution, as applicable.

FIG. 1 illustrates an example embodiment of an environment in which per-viewer engagement-based video optimization is performed.

In this example, suppose that Alice and Bob, using client devices 102 and 104, respectively, both start to watch an episode of "The Throne Games," provided by the XYZ video service, to which Alice and Bob are both long time subscribers. Alice and Bob both live in the same neighborhood of San Francisco and both use the Comcast ISP (Internet Service Provider). In various embodiments, client devices 102 and 104 include personal computers, laptops, cellular phones/personal digital assistants, and other types of information appliances, such as set-top boxes, game consoles, broadband routers, file servers, video servers, and digital video recorders, as applicable.

In this example, when Alice and Bob use their client devices to request the episode, the client devices contact, via network 108 (such as the Internet or any other appropriate network), content distribution coordinator (CDC) 106. In some embodiments, the client devices are redirected to the content distribution coordinator when requesting the content from a headend or content management system. The CDC is configured to provide instructions to Alice and Bob regarding how to obtain the content (e.g., what CDN to obtain the content from and/or the bitrate at which the content should be obtained). The content distribution coordinator provides a centralized platform that is used to perform optimization on a per-client basis.

As will be described in further detail below, the instructions are optimized for each viewing/playback of content (referred to herein as a "view"). The optimization is personalized to the viewer, based on viewer behavior/preferences. For example, suppose that, based on an evaluation of Alice and Bob's respective past/previous experiences and data, content distribution coordinator (CDC) 106 has learned Alice and Bob's behaviors with respect to watching content. By performing personalized optimization based on viewers' preferences, viewer engagement can be improved.

In response to Alice and Bob's respective requests for content, the backend then selects optimal algorithms and control parameters that dictate how content is to be distributed to Alice and Bob, which may be different based on their learned behaviors. Alice and Bob are provided instructions on how to obtain content, such as the initial bitrate at which content is to be downloaded, as well as the length at which an initial player buffer is set. The initial player buffer length indicates when the player is configured to begin playback (e.g., after a set amount of content has been downloaded to the player buffer (e.g., five seconds of content)).

For example, suppose the backend has observed, over multiple views, that Alice is willing to wait up to five seconds for good quality video that is at least 3 Mbps/720p, but would quit watching the video if the quality is much lower, even if it means that the video would show up more quickly. For such a viewer, the learning algorithms executed by the backend classify Alice's behavior as being a picky (with respect to bitrate/resolution) but patient (i.e., willing to wait) viewer for premium video on-demand content. Based on Alice's behavior being modeled as such, content is delivered to Alice in a manner such that the video starts at the highest bitrate (e.g., 6 Mbps/1080), where the initial player buffer length is set to five seconds when the bandwidth is predicted to be good, and ten seconds when the bandwidth is predicted to be more variant. Thus, based on the classification of Alice's behavior as picky but patient, Alice's client will be provided instructions to obtain content in a manner that favors high quality, even if it means a longer startup time.

In contrast, suppose that the backend has learned, based on observing Bob's past experiences and behavior, that he is very impatient, and usually quits if the video does not show up within one second. It is also observed that Bob is willing to watch the video at a lower quality (e.g., 1.5 Mbps/480p), as long as the video starts quickly. Thus, Bob's client is instructed to obtain content at ~1 Mbps, and will have his initial player buffer set at one second.

Thus, although Alice and Bob are watching the same video, the content distribution coordinator provides them different instructions on how to obtain and play content, based on Alice and Bob's learned behaviors. As will be described in further detail below, the instructions can also be determined based on the behavior learned for other similar viewers, using global information. The optimization of the instructions can also be based on real-time performance feedback obtained from clients.

Client

Figure 2:
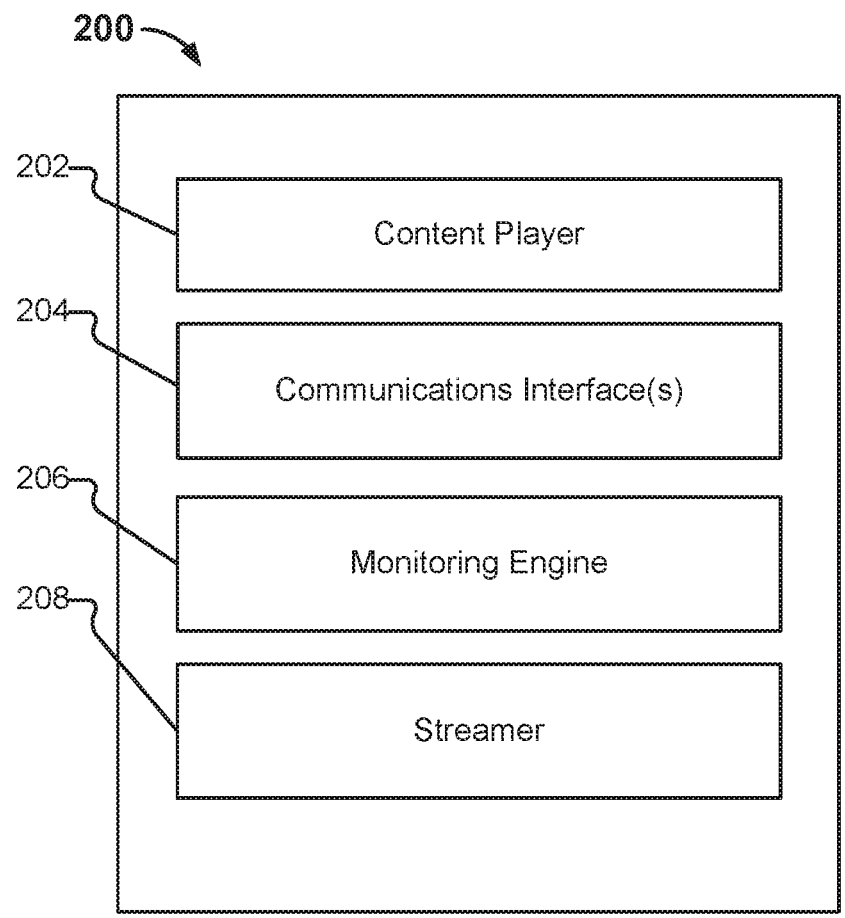
FIG. 2 is a block diagram illustrating an embodiment of a client.

FIG. 2 is a block diagram illustrating an embodiment of a client. In some embodiments, client 200 is an example of clients 102 and 104 of FIG. 1. In the example shown, client 200 includes content player 202, communications interface 204, monitoring engine 206, and streamer 208.

Player 202 is a portion of a client device application and is configured to provide controls for controlling playing of a video stream. For example, the player facilitates/supports the controls of a user interface (UI) that an end user interacts with. In some embodiments, the player is a portion of a client video player application or agent that provides UI controls with which users interact. The player is also configured to render streaming content.

In some embodiments, player 202 is configured to play video content, which is in turn rendered on the client device. In various embodiments, player 202 is implemented as an app (e.g., mobile platform application), via a Flash, Silverlight, or HTML5 player if a web browser application is being used, etc.

Communications interface(s) 204 is configured to facilitate communication of data/information, over a network such as the Internet, between a client (or player resident on client, such as player 202) and remote entities, such as content distribution coordinator 106 of FIG. 1, as well as other remote entities, such as content management systems, CDNs, etc.

Collection of Measures Used to Classify Clients

Monitoring engine 206 is configured to monitor, observe, and collect various types of information associated with a client. The collected information includes measures usable to classify clients and learn viewer behavior/preferences. The measures that are collected that are usable to classify clients and learn viewer behavior/preferences include data regarding viewing experiences and possible reactions to those viewing experiences. In some embodiments, monitoring engine 206 is incorporated in content player 202.

Viewer Experiences and Reactions

The information can be collected at various times during a video streaming session. As used herein, a session refers to an entity representing an instance of a user's playback interactions with a content asset. The session may begin with a user's request for a particular content, and end when the user ceases playing the content (e.g., the user stops watching a requested video).

For example, the information can be collected at the start of a video (e.g., when a user starts to click on a video). The information can include the initial bitrate and CDN used to stream the content, as well as other internal parameters associated with the client, such as player buffer size, download speed, the amount of time before the video starts playing, etc. Information associated with the viewer's reaction to the viewing experience (e.g., the viewer's behavior/actions with respect to different viewing experiences) is also collected, which includes measures and indications of viewer engagement, such as whether the viewer quits a video, the amount of time before a viewer returns to a video they have quit, whether the viewer has restarted the content (e.g., the viewer quit the video but then quickly came back to select the video again), whether the viewer has quit the video to watch another video, whether the user is pausing or fast forwarding the video, whether the viewer quits before the video starts playing or not (and how long the viewer waits before they quit), etc.

As will be described in further detail below, the viewer's behavior can be inferred/learned based on the observed/collected information. In some embodiments, the viewing experience and reaction information is used to train machine learning models that are used to estimate an optimal set of parameters and optimization algorithms for the viewer to optimize their viewing experience and improve engagement.

Real-Time Performance Information

In addition to the observed user behavior information described above, monitoring engine 206 is also configured to monitor performance and quality information associated with the client. Such information includes quality metrics. Examples of quality metrics include bitrate, average bitrate (e.g., average bitrate sustained over the lifetime of a session during which a video is played), buffering, failures, startup time (measure of time of how long the content took to start playing), failure events (e.g., failure to start), etc. Another example of a quality metric monitored by the monitoring engine is buffering ratio, which is a metric indicating operating interruptions. For example, the buffering ratio represents a measure of how often (e.g., percentage of time) a stream is being buffered (and interrupted).

Other examples of information collected by the monitoring engine include local state information. The local state information includes current measurements of the client, such as a content player's current bitrate, current CDN, current player state (e.g., playing, buffering, paused, stopped), current player buffer length, current play head time/position, current bandwidth measurement estimations, current frame rate, etc. Other state information can include events such as buffering and error events. Summaries of state changes can also be generated (e.g., averages of metrics over the session).

In some embodiments, the viewing experience and reaction information and real-time performance information are collected on a per-session basis.

The client is configured to transmit the collected/monitored information to a backend such as CDC 106 of FIG. 1 (e.g., using communications interface(s) 204) for processing. The various information can be transmitted on a per-session basis. The information can be sent, for example, via heartbeat messages, where, in some embodiments, a "heartbeat" message refers to a package/payload of information that is sent from the client to the backend. As will be described in further detail below, CDC 106 is configured to aggregate the collected quality metrics across multiple dimensions (such as the attributes of a client and a session).

In some embodiments, metadata associated with the client/session is also transmitted with the collected information. Examples of metadata information include ISP and geo-information (e.g., city, state, country, etc.). Metadata information also includes device information, such as device model, device version, device type (e.g., mobile, set-top box, gaming console, etc.), operating system running on the client device, version of the operating system, etc. The metadata can also include content information, such as the name of the content to be played, the type of the content/asset (e.g., ONDEMAND, LINEAR_LIVE, LIVE_EVENT, etc.), the type of video protocol associated with the content/asset (e.g., HLS, Smooth Streaming, HDS, etc.), streamer type (e.g., Native Android streamer, NewStreaming streamer, etc. for Android; MP MoviePlayer or AV Foundation streamer for iOS, etc.), HTTP user-agent of the content-playing device, custom tags, etc.

Streamer 208 is configured to stream actual video data. In some embodiments, the streamer is implemented using a set of libraries and code that communicate with and download data (e.g., video chunks) from a content source (e.g., a CDN). In some embodiments, the streamer cooperates with content sources to optimize usage of a streaming buffer.

Content Distribution Coordinator

Figure 3:
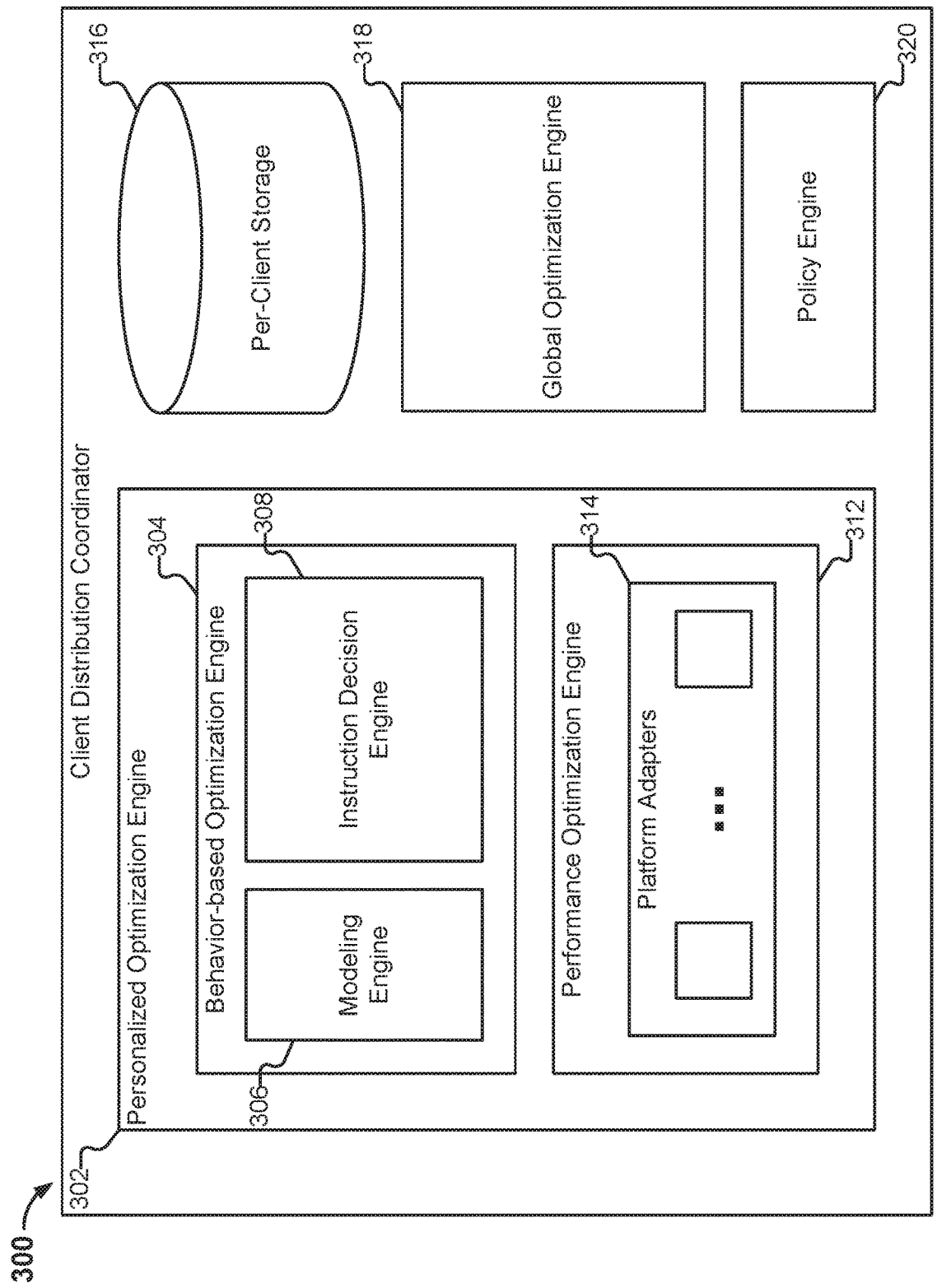
FIG. 3 is a block diagram illustrating an embodiment of a content distribution coordinator.

FIG. 3 is a block diagram illustrating an embodiment of a content distribution coordinator. In some embodiments, content distribution coordinator 300 is an example of content distribution coordinator 106 of FIG. 1. In the example shown, content distribution coordinator 300 includes personalized optimization engine 302, per-client storage 316, global optimization engine 318, and policy engine 320. Personalized optimization engine 302 further includes behavior-based optimization engine 304 and performance optimization engine 312. Behavior optimization engine 304 further includes modeling engine 306 and instruction decision engine 308.

Optimization engine 302 is configured to determine an optimal set of instructions usable to obtain content. As will be described in further detail below, the set of instructions is optimized based on a client's real-time performance and the personalized preferences of a viewer.

Behavior-based optimization engine 304 is configured to perform viewer behavior-based engagement optimization. Modeling engine 306 is configured to use historical information about the viewer/view and/or other viewers/views to learn/infer user behavior and video playback preferences. In some embodiments, learning the behaviors/preferences of a viewer includes generating models (e.g., machine learning models). The generated models of the viewer's preferences are used to predict/suggest/estimate, for the client, an optimal selection of optimization algorithms and control parameters usable to obtain content.

In some embodiments, the information (e.g., historical viewing experience and reaction information) obtained from clients is stored to per-client storage 316. Per-client storage 316 is configured to store records/data stored for each client/viewer. In some embodiments, the per-client storage is a distributed storage system, for example, implemented as a large distributed key value lookup system that is horizontally scalable. When a request by a viewer to watch a stream is received, data associated with the identified viewer/client/view is retrieved from the per-client storage and used to perform viewer behavior-based engagement optimization. The information obtained from clients is also passed to global optimization engine 318, which will be described in further detail below.

As described above, the information collected and provided by the client includes observations of a user's viewing experiences and their reactions to those experiences. The modeling engine is configured to use those observations to learn/classify/identify a viewer's behavior patterns. Inferences can then be made based on the viewer's behavior patterns and used to generate models that are used to determine the optimal manner in which content should be delivered to the viewer.

For example, if the viewer shows a pattern in which they quit playing the video after a relatively small threshold amount of time, it can be inferred/modeled that the viewer is likely not patient. For such a viewer, content should be delivered in a manner such that the wait time for the viewer is reduced as much as possible.

If, during playback, the viewer is observed to frequently quit whenever there is an interruption, no matter how small, then the viewer's behavior is modeled as being intolerant to interruptions. As another example, if the viewer is observed to quit often when the bitrate is low (i.e., the observed viewer's reaction to a low bitrate viewing experience is to quit), then the viewer's behavior is classified as being selective/having high standards with respect to resolution (e.g., the viewer is intolerant of low bitrates). In some embodiments, the observations of the user's viewing experiences and their reactions to those experiences are used as input to machine learning algorithms, such as support vector machines (SVMs) and neural networks, in order to classify the viewer. The classification can be used to generate a predictive model for the viewer that is used to determine (e.g., estimate) an appropriate/optimal set of parameters and optimization algorithms for the particular viewer.

In some embodiments, generated models of a viewer are stored to the viewer's record in per-client storage 316. New observations and information collected for the viewer are used as training data to further refine the learned model of the user and increase the confidence when performing decision making.

In some embodiments, in addition to, or instead of using the information learned about a particular viewer and stored in the per-client storage, global data aggregated from numerous other clients (e.g., that are similar or otherwise correlated to a particular viewer) is also utilized to perform behavior-based engagement optimization. The global information associated with other subscribers/viewers can be used to train the model for a particular client. In some embodiments, the global data is obtained from global optimization engine 318.

Global optimization engine 318 is configured to collect and aggregate information from many clients, content sources, and other nodes in a content distribution environment. In some embodiments, the global optimization engine is configured to use the collected and aggregated information to generate global views of viewer preferences/behaviors and real-time performances across numerous clients/viewers/views. The information that is aggregated and collected includes viewer behavior and client/view performance information collected from clients, such as client 200 of FIG. 2. The global information aggregated from the various nodes is aggregated across various dimensions, such as geolocation, device type, operating system platform, streamer type, ASN, or any other attributes. The global information comprises a knowledge base of user preferences, behavior, and performance that is built using the aggregated data, providing a multi-dimensional map that can be updated in real-time as more information is collected from various nodes.

As will be described in further detail below, the global information can be used to facilitate personalized optimization. When a streaming decision is to be made for a given client, clients similar to the given client are identified, and information associated with those similar clients is used to facilitate determining a decision for the given client. For example, when a decision is to be made for a particular client, the particular client can be classified according to their attributes. The classification can then be used to partition/filter the global information to identify clients similar or otherwise correlated to the particular client. A set of clients sharing similar attributes (e.g., watching the same type of content, located in the same geographical location, on the same ISP, etc.) are then identified. The information about the similar clients, for example, is used as training data to model the behavior/preferences of the requesting client.

Instruction decision engine 308 is configured to select, for the requesting client/viewer/view, an optimal set of instructions usable to obtain content. The instructions include viewer experience optimization algorithms and control parameters that are selected based on the viewer's learned behavior/preferences. In some embodiments, an optimization algorithm comprises an algorithm that is configured to provide the best control parameters for a viewer based on the modeled behavior/preferences of viewers. An optimization algorithm is configured to determine a set of control parameters, such as bitrate, switching rate, bitrate switching time (e.g., when to switch between chunks of different bitrates), switching aggressiveness (e.g., the rate at which a bitrate is increased or decreased), CDN, etc. that will provide a type of viewing experience that is preferred by the particular viewer based on their learned behavior/preferences and that will improve/maximize their engagement. The optimization algorithms are also used to determine control parameters based on the viewing experience of the viewer (e.g., measured, for example, using real-time performance information collected from the client and/or other similar clients).

For example, if a viewer who is requesting to watch content has been modeled as being impatient, then an algorithm that is tuned for less patient viewers is selected. Such an algorithm would focus on fast start up times and low interruptions to minimize buffering so that the viewer is not kept waiting to watch content. The optimization algorithm provides the viewer such a personalized viewing experience by selecting parameters such as a lower starting bitrate, which, while providing lower resolution, will result in a faster join time and less waiting for the impatient viewer. The optimization algorithm can then be used throughout playback to determine various instructions/control parameters, such as when to perform a switch to higher bitrates. For example, the algorithm optimized for less patient viewers can be tuned to switch a viewer's bitrate up only when a relatively large amount of video data has already been buffered, so that when the switch occurs, the viewer will have a lower probability of experiencing buffering. If, however, it is detected that the viewer's network connection is degrading (e.g., due to congestion), then the algorithm optimized for less patient viewers can be tuned to instruct the client to immediately switch down to a lower bitrate once the network congestion is detected so that the client does not spend time buffering to watch content at a higher bitrate.

This may be in contrast to an algorithm that is optimized for viewers that are highly selective with respect to resolution and are patient, who are willing to wait for buffering so that they can watch content at a higher resolution. Such an algorithm may instead have a client start at a high bitrate, even if it means longer start up time and possible re-buffering during playback, so that the viewer can watch the content at a higher resolution. If network congestion occurs, the optimization algorithm for patient, selective viewers may allow the client to wait a longer period of time before instructing the client to switch down in bitrate. This allows the client (and the patient viewer) to potentially wait for network congestion to be resolved until the client can continue to watch at a higher bitrate. This is in contrast to the above example algorithm tuned for impatient viewers, who are told to immediately switch down so that buffering is minimized.

Thus, different optimization algorithms can be tuned that provide varying tradeoffs between metrics such as bitrate, start up time, and buffering based on viewer preferences. The values of the control parameters determined by the optimization algorithms can be refined over time, as more information about viewers and their preferences to various viewing experiences is learned.

Optimization algorithms can also be tuned for different types of content. For example, an algorithm can be tuned to provide instructions that are optimal for sports content, while a different algorithm can be tuned to provide instructions that are optimal for movie content. Optimization algorithms can be tuned for any combination of viewer/view characteristics (e.g., viewer behavior/preferences, content type, network type, device type, etc.).

Example scenarios in which viewers are modeled and their learned preferences are used to determine an optimal set of optimization algorithms and control parameters will be provided below. An example illustrating how optimal control parameter values such as initial bitrate versus join time can be determined (and refined over time) will also be provided below.

In some embodiments, the optimization performed based on viewer preferences is then further refined based on the real-time performance of the client being used by the viewer.

Performance optimization engine 312 is configured to perform optimization based on real-time performance. The performance optimization engine uses the real-time performance of clients to determine an appropriate CDN and/or bitrate for the requesting client. In some embodiments, the performance optimization engine is configured to use platform adaptors 314, information from per-client storage 316, and/or information from global optimization engine 318 when making a performance-based optimization decision.

Adaptors 314 are configured to facilitate processing appropriate to the attributes/characteristics/context of a requesting client streamer. In some embodiments, the adaptors are implemented as plugin modules, where multiple instances of adaptors may be executed and run.

Different streamers may have different attributes/types, such as platform type, operating system type, application type, streamer type, streaming protocol, device type, customer, etc. For clients/streamers with different attributes, different types of processing and information may need to be performed/obtained that are relevant to a particular requesting streamer.

In some embodiments, each adaptor maps to each type of streamer integration that is encountered. A plugin may correspond to a particular set/combination of client/streamer attributes. For example, one plugin may correspond to streamers on clients running the iOS® operating system, on the iPhone® 6, streaming using the HBO® app, while a different adaptor plugin may correspond to streamers on the Amazon Fire Phone®, streaming using the ESPN® app. Adaptors corresponding to any other appropriate contexts, dimensions, or types of streamers with which the content distribution coordinator can be integrated can be implemented.

In some embodiments, when a request to stream content or a heartbeat is received from a client, the multi-dimensional client attributes associated with the client/streamer are used to identify an appropriate adaptor. The identified adaptor is then used to facilitate the relevant processing/workflow appropriate to the requesting client streamer. As described above, different types of streamers may require different types of processing, potentially resulting in different decisions being made for different types of streamers.

As one example, different types of streaming policies may be enforced depending on the type/attributes of a requesting client streamer. In some embodiments, an identified adaptor is configured to obtain a particular corresponding set of policies. The policies can be obtained from a server or data store such as policy engine 320, which is configured to maintain streaming policies.

The policies include policies that define various streaming decision parameters. For example, a customer such as HBO® may define a policy that indicates that for iOS® devices using the HBO® streaming app, only certain CDNs and bitrates should be used. As another example, iOS® devices may only be able to support the HLS protocol, where the HLS protocol may have certain built-in requirements that must be adhered to. Thus, one decision that applies to iOS® devices may not apply equally to another device, such as a Microsoft® XBOX, which uses Microsoft's® smooth streaming protocol. The policies can be used to facilitate in determining streaming decisions appropriate for the particular requesting client.

As described above, based on the static attributes of a client/session/view, the performance optimization engine is configured to identify (e.g., using the adaptors described above) a set of applicable policies and rules appropriate for a client, which are used to determine an appropriate set of instructions (e.g., bitrate and/or CDN) for the client. In some embodiments, the performance optimization is also configured to utilize local client state information (e.g., obtained from per-client storage 316) and global information regarding real-time global performance (e.g., obtained from global optimization engine 318) when determining an optimal set of instructions for the client. In some embodiments, a selected adapter is used to obtain a corresponding set of performance-based decision algorithms, which are configured to make an optimal performance-based decision for an active viewer, which will be described in further detail below.

The performance optimization engine is configured to utilize local client state information in conjunction with global information when generating a decision. By maintaining both the local states of individual clients along with globally shared data of the various clients consuming content and merging them together when performing streaming decision making, fine grain decisions can be made on a per-client, per-session basis. In some embodiments, a new decision can be made for each heartbeat received from a client. The decisions can be made at a chunk-level granularity, where the performance optimization engine performs a new determination of content source and/or bitrate for a next/subsequent chunk to be downloaded. Thus, for example, if a client is playing multiple streams, different decisions can potentially be made for each of the chunks being played in the different streams.

As one example of the processing performed in generating a decision, suppose that a heartbeat is received from a client. In response to receiving the heartbeat, the multi-dimensional attributes of the requesting client are extracted from the heartbeat. The attributes are used to identify a particular adaptor (e.g., from platform adapters 314), which in turn obtains a policy (e.g., from policy engine 320) appropriate to the context of the requesting client. The content distribution coordinator then uses the policy, local state information, and global state information to make a determination of an optimal content source and/or bitrate for a chunk to be downloaded by the requesting client.

In some embodiments, the attributes of the client are used (e.g., by the global optimization engine) to partition global information aggregated from numerous clients/nodes to identify a set of clients correlated to the requesting client.

The performance information associated with the clients is evaluated to determine a set of candidate options for content source and/or bitrate (e.g., for a video chunk to be downloaded by the client).

The local client state information corresponding to the particular requesting client (e.g., obtained from per-client storage 316) is then used to make a selection of an optimal solution for the content source and/or bitrate for the requesting client's streaming session. Rules established by obtained policies can also be used in making the determination. In some embodiments, chunk information, such as roundtrip latencies, error events, frame rate issues, etc. is also be used when making the streaming decision.

In some embodiments, the set of instructions (bitrate and/or CDN as well as scheduling) is determined by optimizing the use of a client buffer, for example, to prevent buffering or re-buffering. For example, the streamer decision engine can determine, using global shared data, a set of candidate bitrates and/or content sources based on the performance of other clients identified as similar (or otherwise correlated) to a requesting client. The client's local state information, such as its current bandwidth, buffer length, etc. can be used by the streamer decision engine to determine which of the candidate bitrates and/or content to provide in instructions to the requesting client.

Various types of decisions with different parameters/conditions can be generated. For example, the performance optimization engine can be configured to determine whether a switch in content source and/or bitrate should be made for the next chunk. A decision can also be made regarding when the switch/change should go into effect. For example, the client can be sent instructions to: make the switch immediately (and stop whatever downloading is currently in progress); wait a certain amount of time before making the switch; stay with the current stream (e.g., current CDN and/or bitrate), etc. The instructions can also define a switching point on a chunk-by-chunk basis, for example, to drop the current chunk being downloaded and switch to the new chunk immediately, switch at the next chunk boundary between downloading chunks, or to continue with chunks from a current CDN and/or bitrate (and not make a switch). Thus, the streamer decision engine can determine whether a switch should be made, and if so, when a switch should be made, and instruct the client accordingly. In some embodiments, the instructions include a chunk URL for the next chunk to be played by the streamer (where the chunk URL is for a chunk that corresponds to a determined content source and/or bitrate). Example scenarios involving different chunk downloading instructions will be provided in further detail below.

In some embodiments, the decisions/instructions generated by the performance optimization engine are stored (e.g., to the per-client/session records of the requesting client), for example, as historical information. Performance information associated with each of the decisions can also be monitored and associated with the decisions/instructions in client session records.

The decisions made for a client by the performance optimization engine can include initial streaming decisions (e.g., for the start of a video streaming session) as well as midstream decisions (e.g., decisions made while streaming). In some embodiments, the initial streaming decisions are made based on specific and fixed information, such as a requesting of the client's history before the current session and the global data across other similar clients. In some embodiments, the mid-stream decision logic also utilizes both the client's history and the global data, but because decisions are to be made constantly for mid-stream control, various other metrics may be tracked proactively as well, such as playback buffer size. These tracked metrics can be used to arrive at optimized decisions throughout the life of the streaming session.

Thus, the use of hyper-local client state information in conjunction with global performance information aggregated from multiple clients allows for precise, fine grain streaming decisions that are tailored/targeted to the particular context of a requesting client. Having a single decision point in which the client's multi-dimensional context, local client information, and global historical information aggregated from other clients are merged provides a combined model in which a rich data set is used as input in determining a streaming decision.

As one example scenario, suppose that a client requests streaming instructions. Client records can be obtained (e.g., from per-client storage 316) for the particular client. Suppose that the records include historical information for the requesting client indicating that the user associated with the client has watched five videos of a particular streaming service, all of which were streamed from a particular CDN. The average streaming performance of the five videos can be evaluated. The local average performance experienced by the particular requesting client can then be compared to the performance of other similar clients (e.g., in the same geography as the requesting client, having the same device type or streaming app, etc.) identified from global shared data (e.g., obtained from global optimization engine 318). The local and global information can be used to make a decision that is targeted specifically to the context of the requesting client (where the context can be reflected across multiple dimensions such as device type, client operating system, streaming application, etc.). The decisions made by the streamer decision engine can be made for both live and on-demand video streaming, as well as any other appropriate type of audiovisual content streaming.

As another example scenario, suppose that for a given client requesting content, there are two available CDNs that can be assigned as sources of the requested content, CDN A and CDN B. The decision of which CDN to assign to the given client is performed by evaluating the data collected from many other clients. While the given client may not have enough information to make such a decision, the global optimization engine can use its global view of performance (real-time or historical) across many clients to determine that clients similar to the requesting client have experienced better performance using CDN B. CDN B will then be recommended to the requesting client.

As another example scenario, optimization of a buffer can be performed to determine what instructions to send, as well as a time at which to execute the instructions. For example, based on an assessment of the buffering state of a client (e.g., by analyzing data received from a client in a heartbeat), the streamer decision engine can predict that a buffering event may occur. An optimal source and/or bitrate can be determined by the streamer decision engine such that the client does not experience (re)buffering or any issues in rendering content. Instructions indicating that the switch should be made and a time to make the switch are then generated and sent to the client to be enforced.

In some embodiments, the results generated by the behavior-based optimization engine and the performance optimization engine (e.g., optimal bitrates and/or CDNs) are merged to determine a final set of instructions (e.g., optimal bitrate and/or CDN, as well as scheduling for switching) for a requesting client/view.

The instructions generated by the personalized optimization engine, optimized based on viewer preference and real-time performance, as described above, are provided/transmitted to the requesting client, which is configured to execute the instructions and enforce the decisions made by the personalized optimization engine (e.g., where video chunks/segments/data are downloaded according to the streaming decision in the instructions).

Content distribution coordinator 300 is illustrated as a single logical device in FIG. 3. In some embodiments, content distribution coordinator 300 comprises standard commercially available server hardware (e.g., a multi-core processor, 4+ Gigabytes of RAM, and one or more Gigabit network interface adapters) and runs typical server-class operating systems (e.g., Linux), as well as JAVA HTTP server software stack. Content distribution coordinator 300 can also be implemented using a scalable, elastic architecture and may comprise several distributed components, including components provided by one or more third parties. Further, when content distribution coordinator 300 is referred to herein as performing a task, such as storing data or processing data, it is to be understood that a sub-component or multiple sub-components of content distribution coordinator 300 (whether individually or in cooperation with third party components) may cooperate to perform that task.

Examples of Selection of Personalized Viewer Experience Optimization Algorithms and Control Parameters The algorithms used for personalized viewer experience optimization are based on a variety of different types of algorithms. A first example type of algorithm is feedback-based learning algorithms that adjust the optimization algorithms based on viewer's reactions to their viewing experiences so far. A second example type of algorithm is classification-based prediction algorithms, which classify the viewer and the view based on the information of the viewer, the content, the device used, network conditions, etc. The classification aids the optimization algorithms to use the information/algorithms of other similar viewers and views to optimize the experience of the current viewer and view.

The algorithms include both initial selection of algorithms and how to adjust the algorithms based on previous data, for example, for return viewers.

Algorithms for Initial Selection of Personalized View Experience Optimization Algorithms and Control Parameters When a new attempt to watch a video arrives (e.g., a request to start a new streaming session is received), per-client storage 316 is checked to determine whether there is existing information about the viewer. A return viewer can be identified in a variety of ways. For example, when a subscriber comes back with a subscriber id, or when a cookie is used to track the viewer, it can be identified whether or not the viewer is a return viewer.

Algorithms for Handling Initial Selection for New Viewers

If the viewer is determined to be a new viewer, the view and the new viewer are classified based on the associated content, device, and network conditions (e.g., determined based on the IP address of the viewer content), as well as other information such as the publisher of requested content, the website at which the content request was made, a referred web site, etc. Machine learning algorithms take such as input information, and use models (that are built based on past/historical data of other viewers/views) to determine the appropriate set of view experience optimization algorithms and control parameters for the new view, which includes what should be the initial bitrate, initial CDN, initial buffer size, and targeted start up time for the view. For similar attempts, the control parameters and optimization algorithms that worked best previously are used for the current new attempt.

For example, consider a new subscriber who starts to watch a video, such as a live football game on an iPad Air 2 tablet with iOS 8 installed, via a home WiFi network of Comcast in the San Francisco geographic location/region, with a zip code of 94105. Based on the historical data collected from other subscribers (i.e., global data), machine learning models are built to suggest the best optimization and control parameters. Examples of machine learning models are provided below. The models are used to help pick algorithms that are best suited for live sports games with a reasonable connection, being watched on an iPad Air 2 running iOS 8.

For such a view, the following example parameters may be set: start the view at a bitrate of ~2 Mbps (a fairly good quality, but not the highest, so that the view can start very fast while the initial resolution is not too low); use a Level 3 CDN (if Level 3 is the best available CDN for that geographic location and that ISP); 500 ms initial player buffer to start playing (because the internet connection is good, and the chances of re-buffering events occurring later are low, so the player can start to play video without buffering a large amount of data); the player can be instructed to switch the bitrate to a higher quality (e.g., 3.5 Mbps) after the playback buffer has reached 5 seconds, and then to switch to the highest bitrate (e.g., 6 Mbps) if there is no buffering and the available connection bandwidth is higher than the highest bitrate.

Algorithms for Handling the Initial Selection for Return Viewers

If the viewer is identified as a return viewer, then information about the viewer's viewing experiences and reactions to those experiences are retrieved (e.g., from per-client storage). The information specific to the viewer, along with information associated with other viewers (e.g., similar viewers) is used by machine learning-based algorithms to decide and adjust the optimization algorithms and control parameters for this viewer.

The information from other viewers provides a baseline for the algorithms and parameters based on the general viewing behavior for the relevant device type, content type, geographic region, network type, etc. Information pertaining to this specific viewer is then used to further refine the baseline towards the specific viewing behavior of this viewer based on previous viewings of similar content on a similar (or same) device.

For example, suppose that a viewer has been a subscriber for six months, and during that span, has watched a great deal of live sports. Suppose that the viewer now starts to watch a video, a live NFL sports game with an iPad Air 2 with iOS 8, via a home WiFi network of Comcast in the San Francisco area, zip code 94105. Based on historical information of this viewer's viewing habits, viewing experience, and reactions to those experiences, and the machine learning models built using the viewer's past information and the information of other viewers, it is determined that this viewer is very impatient with respect to watching live sports events, and wants to watch the video as soon as possible, even if it means watching the video at a lower resolution.

Based on such information about the viewer, an algorithm is selected that supports live sports games for less patient viewers. The algorithm ensures that the viewer is provided the lowest interruption rate, even if it results in a tradeoff of having lower resolution. For example, based on historical data, it can be determined that the user is typically happy with a bitrate of 2 Mbps, but is willing to tolerate bitrates as low as 1 Mbps at the start of live sports streams so that the stream can start quickly. Thus, for example, an algorithm can be selected to focus on fast start up times and low interruptions, with lower bitrates being acceptable as needed (e.g., the selected algorithm is biased towards fast startup times and low interruptions versus higher bitrate). For this viewer, the algorithm may output the following control parameters: start the stream at a bitrate of ~1 Mbps (as the viewer has historically found this bitrate acceptable); use the Level 3 CDN (since Level 3 has been determined to be the best available CDN for the geographic location and ISP of the viewer); use a 100 ms initial player buffer to start playing (where the stream will start after 100 ms of content has been buffered—the relatively short amount of time is acceptable, as it means that the playback will start sooner, and there is a low likelihood of re-buffering as the viewer's connection is good); switch the viewer up to 2 Mbps after the playing buffer has reached 7 seconds of content; and then switch the viewer up to 3 Mbps when the largest playing buffer for live events is reached (e.g., 15 seconds), where the switch up to higher bitrates would only be made if there is no buffering and the available bandwidth is much higher than the highest bitrate.

Algorithms During Playback for Selecting Personalized View Experience Optimization and Control In addition to selecting optimization algorithms and control parameters at the initial start of a session, the algorithms and control parameters can also be adjusted throughout the viewing session as needed, for example, based on the viewer's past experiences and reactions, as well as experiences and reactions of other similar viewers, using machine learning algorithms.

For example, for the above described viewer, based on an evaluation of the viewer's past viewing experiences and the viewer's reactions, suppose that it is determined that the viewer is impatient with respect to interruptions, but can tolerate bitrates as low as 1 Mbps initially, and is typically satisfied with watching video at a bitrate of 2 Mbps. It is further determined that when there is an interruption that is longer than two seconds, the viewer restarts the viewing, hoping to improve it. Based on such learned knowledge of the behavior of the viewer, an algorithm is selected that attempts to ensure that there is as little interruption as possible, that is conservative with instructing the client to switch the bitrate up, and that is more aggressive when switching bitrates down. If the viewer is also determined, for example, to have a reasonable cable connection, but that the bandwidth is fluctuating more than usual (e.g., due to a bad wireless router, or the viewer is using the bandwidth for other purposes, such as downloading/uploading data/pictures while watching the live sports event), then the algorithm can also be more conservative when switching up the viewer's bitrate (as the viewer's bandwidth is not stable).

Various machine learning algorithms can be used that take into account the previous viewing experiences and reactions of return viewers and other viewers in order to decide how to optimize the viewing experience. Examples of machine learning algorithms include linear regression algorithms, logistic regression algorithms, various classification algorithms, and neural networks.

Figure 4A:
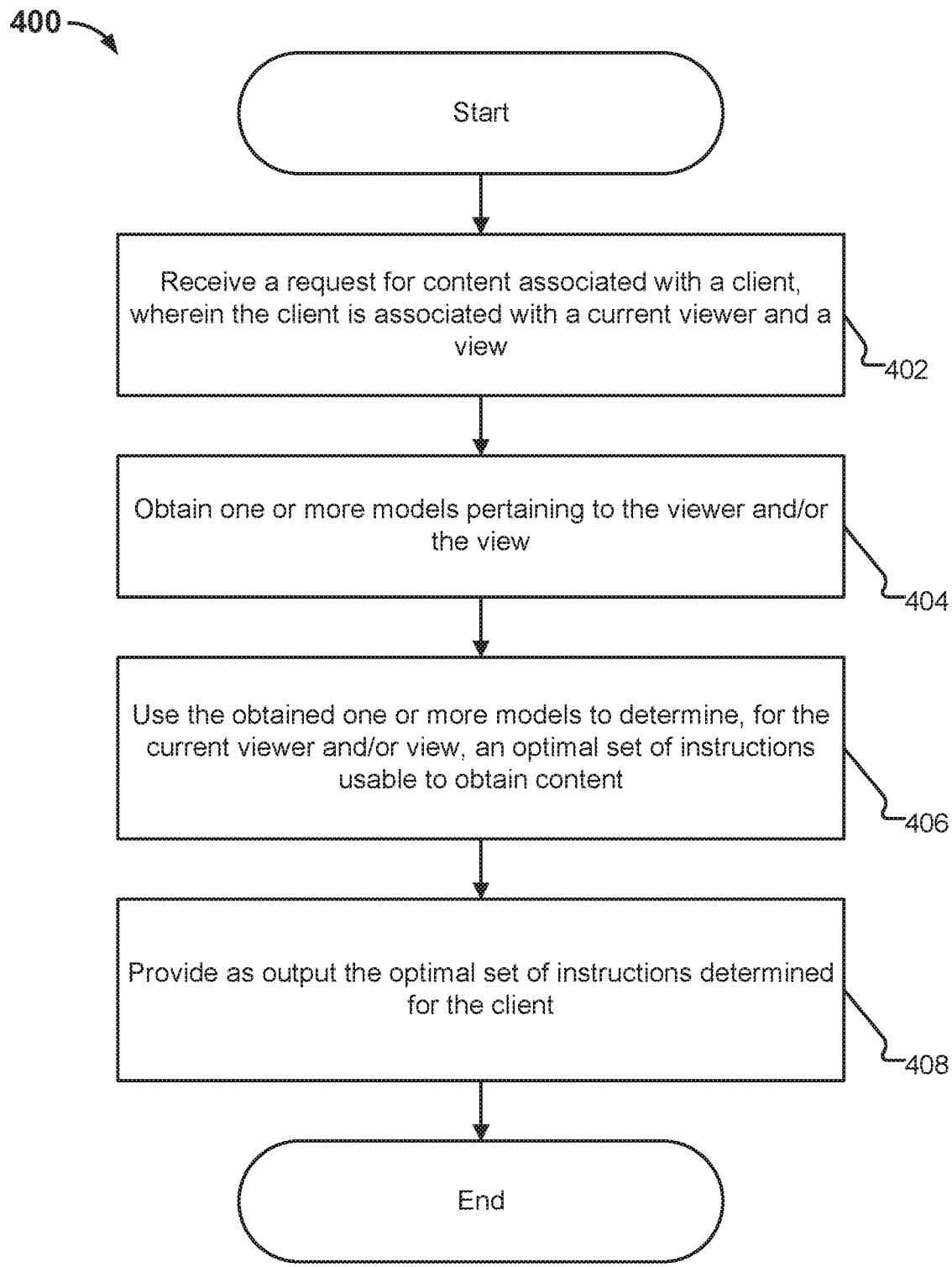
FIG. 4A is a flow diagram illustrating an embodiment of a process for per-viewer engagement-based video optimization.

FIG. 4A is a flow diagram illustrating an embodiment of a process for per-viewer engagement-based video optimization. In some embodiments, process 400 is executed by content distribution coordinator 300 of FIG. 3. The process begins at 402 when a request for content is received. In some embodiments, the request for content is a request to start a multimedia (e.g., video) stream (e.g., a current view/streaming session). The content request can be initiated by a current viewer (e.g., who has clicked "play" on a selected video). The content request can be received from a client device used by the current viewer that is used to initiate the current view being requested. The content request can also be initiated by a proxy of the current viewer, for example, through an application programming interface (API) to the content distribution coordinator. One example of a proxy for a viewer for obtaining the optimal parameters is a video service providers content management system (CMS).

At 404, one or more models pertaining to/personalized for the current viewer and/or view are obtained. The models are used to model/learn/infer/profile the behavior and video playback preferences of the viewer and determine/select, for the viewer, a personalized, optimal set of control parameters. The optimal set of control parameters is selected to maximize the engagement of the viewer. The models are generated using historical data pertaining to the viewer and/or other viewers/views determined to be similar to the requesting viewer (i.e., historical data is used to generate and train the models). The historical data includes information associated with viewing experiences and viewer reactions to those experiences, as described above. The viewing experience and reaction information can be collected from viewers (e.g., when a viewer selects a video and/or throughout a streaming session).

The control parameters for viewing experience information and the viewing experience itself are indicated/represented/measured using information such as initial bitrate and CDN used, as well as other internal parameters such as player buffer size, download speed, etc., as well as other information, such as how long it takes before a video begins to play. Viewers' reactions to such experiences are determined, for example, based on observed actions of the viewer/events correlated to those experiences, such as quitting of a stream, whether the viewer returns to a stream (e.g., measured against a threshold amount of time), whether the viewer restarts (e.g., quits the stream and quickly comes back), quits a stream to watch another content item, pauses a video, fast forwards a video, whether or not the viewer quits before the video starts to play (and how long the viewer waits before quitting), etc. The viewing experience and reaction information can be evaluated to determine patterns, which are used to infer/model/profile/classify the viewer's behavior (e.g., whether the viewer is impatient or not) and determine the optimal set of viewer experience algorithms and control parameters for the viewer.

In some embodiments, the models/algorithms used to perform personalized viewer experience optimization are obtained using feedback-based learning algorithms (e.g., that can adjust over time based on viewers' reactions to their experiences so far). The models can also be obtained using classification-based prediction algorithms. The classification-based prediction algorithms classify the current viewer and the view based on information about the viewer/view/client. The classification can be used to identify similar viewers to the current viewer. Information associated with those similar viewers can then be used to optimize the experience of the current viewer and the view. Various machine learning algorithms, such as support vector machines (SVMs), neural networks, etc. can be used to classify/model the behavior/preferences of viewers. In some embodiments, the model of a viewer's behavior and/or preferences is determined by directly soliciting the viewer (e.g., by asking the viewer of their preferences between join time and quality). Further details regarding obtaining of the models will be described in further detail below with respect to process 450 of FIG. 4B.

At 406, the obtained models are used to determine an optimal set of instructions for the current viewer/view. The optimal set of instructions includes an optimal set of view experience optimization algorithms and control parameters usable to obtain content. The optimal set of control parameters can be determined at the onset of a requested view (e.g., an initial selection of control parameters is determined for the start of the stream). In various embodiments, the initial selection of control parameters for the current view includes initial bitrate, initial CDN, initial player buffer size, targeted startup time (e.g., join time), etc. In some embodiments, the optimal set of control parameters is used to determine, for the current viewer/view, an optimal tradeoff between parameters such as targeted join time and initial bitrate/resolution. In some embodiments, the optimal view experience algorithms selected based on the modeling of the viewer/view are tuned to determine an optimal set of instructions to provide based on the viewer's current viewing experience (which may change throughout playback). For example, the view experience algorithm may determine, for a viewer that is modeled as someone who is impatient and does not like buffering, that if network congestion is detected (a measure indicative of the viewing experience), the viewer's client should be provided instructions to switch down to a lower bitrate as soon as possible. This may be in contrast to another viewer facing the same viewing experience. For example, for another viewer that is modeled as being highly selective with respect to quality (e.g., the viewer has a strong preference for high bitrate), then the view experience algorithm selected for such a viewer will attempt, under the same network congestion scenario, that the viewer be kept at the highest bitrate for as long as possible. Thus, the selected optimization algorithm is configured to provide control parameters such as bitrate, CDN, bitrate switching scheduling (e.g., when to switch from one bitrate to another), switching aggressiveness (the rate at which a bitrate is increased or decreased) etc. that are personalized to the preferences of the viewer The selection/determination of personalized view experience optimization and control parameters can also be performed during playback, where the parameters and modeling of the current viewer can be adjusted throughout the viewing session as needed, for example, based on the current viewer's past experience and reactions and other similar viewers' experiences and reactions (e.g., using machine learning algorithms).

In some embodiments, the control parameters personalized to the client/viewer/view based on the modeling of the behavior and playback preferences of the client/viewer/view is further refined using real-time performance and quality information and/or policy information, as described above.

At 408, the determined optimal set of instructions is provided to the client associated with the viewer/view. The client is configured to obtain content according to the determined optimal set of instructions, for example, according to the control parameters described above. Thus, using the techniques described herein, a set of personalized view experience optimization and control parameters (which may be determined to be different for different viewers) can be determined and provided to maximize engagement. In some embodiments, the optimal set of instructions determined for the client is provided directly to the client. In other embodiments, the optimal set of instructions determined is provided to the client via a proxy such as a CMS.

Figure 4B:
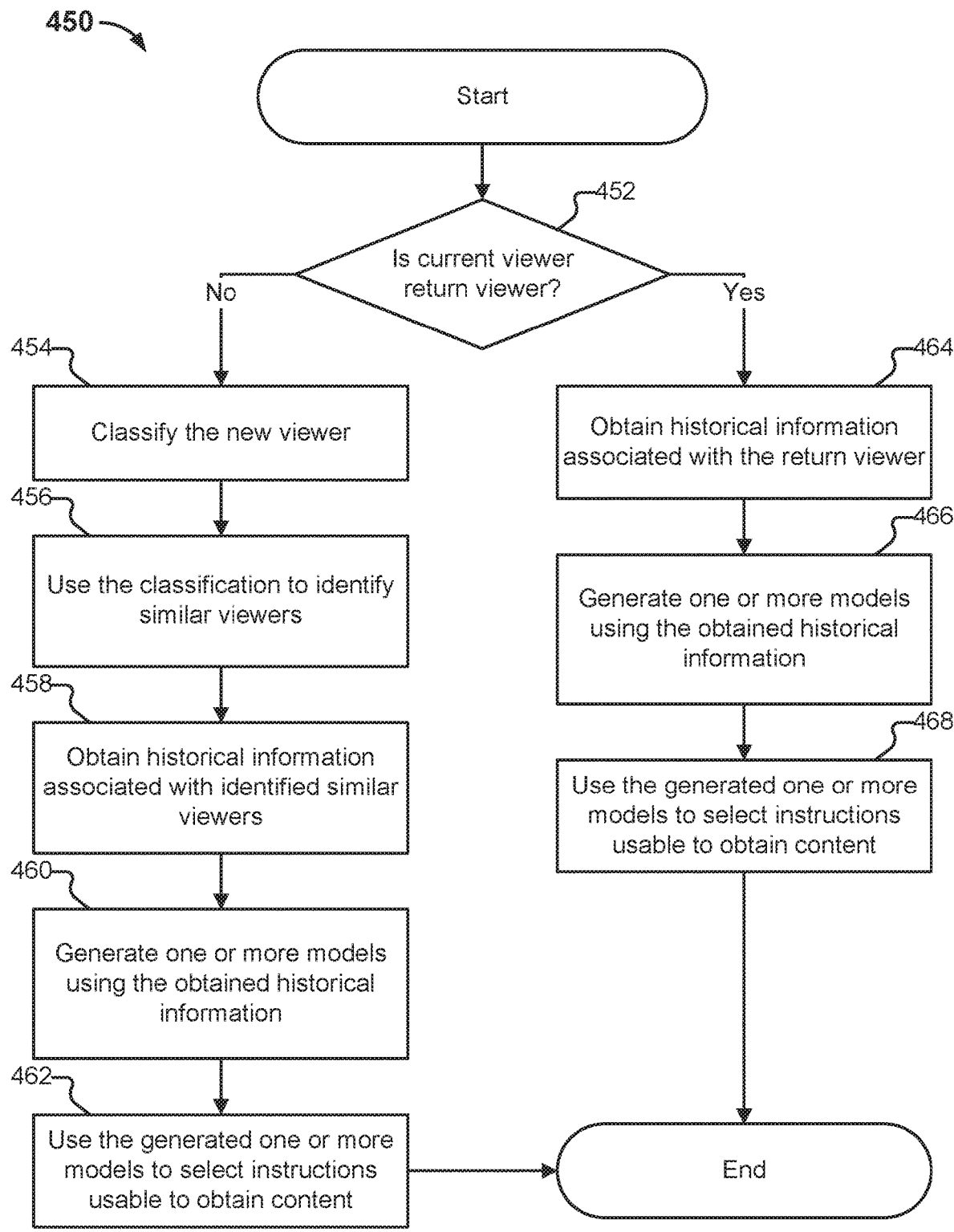
FIG. 4B is a flow diagram illustrating an embodiment of a process for obtaining one or more models.

FIG. 4B is a flow diagram illustrating an embodiment of a process for obtaining one or more models pertaining to a viewer/view/client. In some embodiments, process 450 is used to implement steps 404 and 406 of process 400 of FIG. 4A. In some embodiments, process 400 is executed by content distribution coordinator 300 of FIG. 3. The process begins at 452 when it is determined whether the current viewer is a new viewer or a return viewer. The determination of whether the current viewer is a return viewer or a new viewer can be based on identifiers such as subscriber IDs, trackers such as cookies, etc.

If the viewer is determined to be a new viewer, then the process continues to step 454. If the viewer is determined to be a return viewer, then the process continues to 464. In some embodiments, in addition to or rather than determining whether the current viewer is a new or return viewer, it is determined whether there exists any existing information (e.g., historical data) for the current viewer (e.g., by checking per-client storage/records associated with the current viewer). If no existing information exists for the current viewer (who may be a returning viewer, but does not have any associated historical data stored), then the process continues to 454 (e.g., as if the current viewer is a new viewer). In some embodiments, if existing information is located for the current viewer, then the process continues to 464.

Obtaining a Model for a New Viewer

At 454, the new viewer (and/or the view) is classified. In various embodiments, the new viewer and/or view is classified based on attributes such as content, device, network conditions (e.g., based on the Internet Protocol (IP) address of the connection of the client device associated with the viewer), publisher, the website from which the request was made, the referred website, type of content being requested, type of network connection, client device type, geographic region of the client (e.g., zip code), etc.

At 456, other viewers similar to the new viewer are identified based on the classification. In some embodiments, other viewers that have been similarly classified to the new viewer or otherwise correlated to the new viewer based on such attributes described are identified (e.g., from global information).

At 458, historical information associated with the identified similar viewers is obtained. The historical information includes view experience and reaction information, as described above. At 460, one or more models are generated using the historical information. For example, using the historical view experience and reaction information collected/aggregated from the similar other viewers, machine learning models are built. In some embodiments, previously generated models already built for the other similar viewers/views are obtained (e.g., from global information). In some embodiments, the generated model is stored to the new viewer's/client's per-client storage (where a new record is established for the new viewer/client). The model can then be refined over time (e.g., as new viewing experience and reaction information is collected for the viewer and/or other viewers). Multiple models can be built for a viewer. For example, different models tuned for different factors such as content type can be generated. As one example, a viewer's behavior and preferences with respect to sports content can be modeled, while another model can be built for the viewer's behavior and preferences with respect to movie or episodic content. The different models built for a viewer can be stored to a viewer's per-client storage/profile.

At 462, the generated models are used to determine, for the new viewer, an optimal set of instructions usable to obtain content. The determined instructions include selection of an optimal set of view experience optimization algorithms and control parameters for a viewer with the attributes of the new viewer (e.g., based on content type, content length, network connection type, device type, operating system, etc.). Examples of parameters that may be set include initial/starting bitrate, initial CDN, initial player buffer size (e.g., 100 ms, 500 ms, or any other appropriate buffer size), when to switch bitrates (e.g., after a specified buffer point (e.g., 5 seconds) or to switch to the highest available bitrate if there is no buffering and the bandwidth of the client exceeds the highest bitrate), etc. Thus, for new viewers, the control parameters and optimization algorithms that were determined to be optimal for similar views/viewers are applied to the current new viewer/view.

Obtaining a Model for a Return Viewer

At 464, historical information (e.g., viewing experience and reaction information described above) associated with the return viewer is obtained (e.g., retrieved from per-client storage/records associated with return viewer). At 466, one or more models are generated for the return viewer using their obtained historical/past data. For example, patterns can be identified in how the viewer reacts to various viewing experiences to model their behavior and determine their video playback preferences. In some embodiments, an existing model is adjusted using any newly collected viewing experience/reaction information. In some embodiments, information associated with other (e.g., similar or other correlated) viewers can be obtained (e.g., identified and obtained similarly to as described in steps 454-458). For example, information from other viewers can be used to provide a baseline for the model to select view optimization algorithms and control parameters based on the general viewing behavior for the relevant device type, content type, geographic region, network type, etc. The particular information pertaining to the return viewer would then refine the baseline toward a specific viewing behavior of the particular return viewer (e.g., on previous viewings of similar content on similar devices). In some embodiments, the generated model is stored to the return viewer's/client's per-client storage. The model can then be refined over time (e.g., as new viewing experience and reaction information is collected for the viewer and/or other viewers). Thus, the model of the return viewer can be built using the viewer's past information as well as the past information of other viewers. As described above, multiple models can be created for the viewer (e.g., for different types of content).

Various machine learning algorithms can be used for using the previous viewing experience and reactions of return viewers and other viewers to facilitate deciding how to optimize a viewing experience. Examples of such machine learning algorithms include linear regression, logistic regression, various classification algorithms and neural networks, or any combination thereof.

At 468, the generated one or more models are used to determine, for the return viewer, an optimal set of instructions usable to obtain content. The determined instructions include selection of an optimal set of view experience optimization algorithms and control parameters for a viewer based on the models generated at 466. Examples of control parameters that may be set include initial/starting bitrate, initial CDN, initial player buffer size (e.g., 100 ms, 500 ms, or any other appropriate buffer size), when to switch bitrates (e.g., after a specified buffer point (e.g., 5 seconds) or to switch to the highest available bitrate if there is no buffering and the bandwidth of the client exceeds the highest bitrate), etc. Thus, for return viewers, the historical information associated with the return viewer (and/or the historical information of other viewers determined to be similar) can be used to determine the control parameters and optimization algorithms optimal for the current return viewer.

Below are further use case examples illustrating per-viewer engagement-based video optimization.

Example Use Case—Join/Startup Optimization

The following is an example scenario illustrating join/startup time optimization. For example, a tradeoff exists between bitrate and join time, which is illustrated using the example expressions below.

The amount of data that needs to be downloaded to start playback can be expressed using the following equation/model:

$$\text{initial\_bitrate} \times \text{buffer\_time} \qquad (1)$$

The amount of data that can be downloaded before a viewer can join a stream can be expressed using the following equation/model:

$$\text{bandwidth} \times \text{join\_time} \qquad (2)$$

The previous formulations can be used to express what occurs at join, where the amount of content needed to be downloaded to start playback (1) is equated with the amount of content needed to be downloaded before a join can occur (2):

$$\text{initial\_bitrate} \times \text{buffer\_time} = \text{bandwidth} \times \text{join\_time} \qquad (3)$$

Using the above (3), the join time as a function of initial bitrate can be expressed as:

$$\text{join\_time} = \frac{\text{buffer\_time}}{\text{bandwidth}} \times \text{initial\_bitrate} \qquad (4)$$

As shown in expression (4), there exists a tradeoff between join time and initial bitrate. While a higher initial bitrate means a higher resolution for the viewer, it also results in a longer join time, which means that the viewer is also left waiting for longer. Different viewers may have different preferences with respect to resolution versus wait time, where some viewers prefer to wait for higher resolution, while other viewers are impatient and would rather have their stream start faster, even it requires obtaining content at a lower initial bitrate.

In the example of expression (4), as buffer time increases (while holding initial bitrate and bandwidth), join time also increases. Thus, the buffer time of the client (based on the playback buffer size of the client's content player) can also be taken into consideration when determining the initial bitrate parameter to provide as an instruction to a client. The bandwidth of a client can also be taken into consideration when determining the initial bitrate parameter to provide as an instruction to a client (e.g., as bandwidth increases, join time decreases).

As will be described in further detail below, using an equation such as (4) to model the tradeoff between join time and initial bitrate for a viewer allows for a determination of an initial bitrate to provide given a viewer's network and content player characteristics (e.g., bandwidth and buffer time, respectively) as well as the viewer's preferences for waiting (join) time and video quality (initial bitrate).

Figure 5:
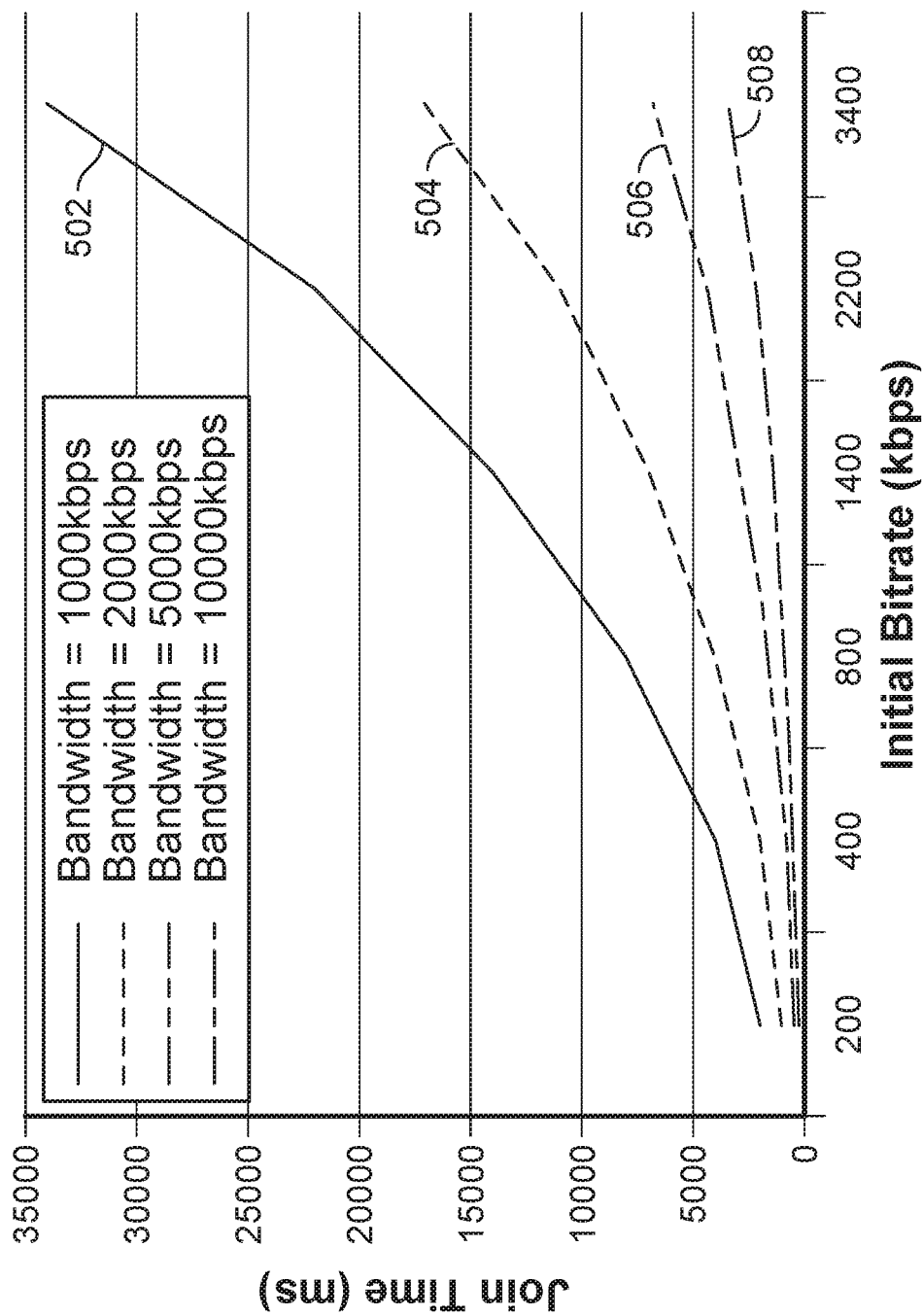
FIG. 5 is an embodiment of an example plot illustrating the tradeoff between join time and initial bitrate.

Any other expressions/formulations for modeling the relationship between join time and initial bitrate can be used as appropriate. For example, based on the example expression (4), fixed player buffer (time) and bandwidth results in a constant coefficient and a linear relationship between initial bitrate and join time, where the slope is buffer time/bandwidth (e.g., linear model). FIG. 5 illustrates an example of non-linear modeling of join time versus initial bitrate, that results in the example curved (e.g., nonlinear) graphs described below in conjunction with FIG. 5.

FIG. 5 is an embodiment of an example plot illustrating the tradeoff between join time and initial bitrate.

As shown in this example, higher bitrates correspond/lead to longer join times. Graphs 502, 504, 506, and 508 respectively show different plot lines/graphs corresponding to different bandwidths (1000 Kbps, 2000 Kbps, 5000 Kbps, 10000 Kbps, respectively). While higher bitrates lead to longer join times, as the available bandwidth increases, there is a decrease in the rate at which join time increases with initial bitrate (i.e., the more available bandwidth, the shorter the join time).

Figure 6:
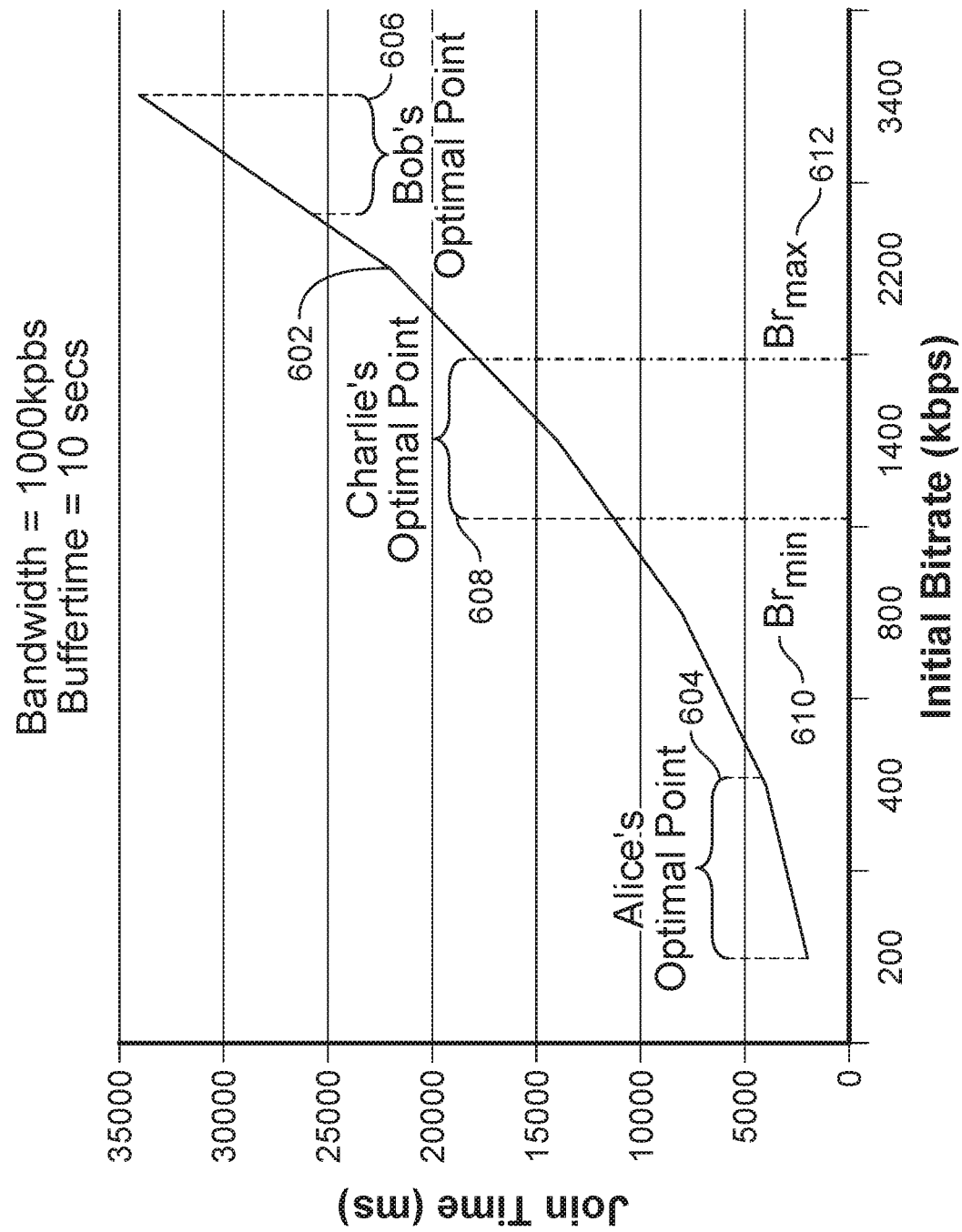
FIG. 6 is an embodiment of an example plot illustrating different tradeoffs between join time and initial bitrate.

FIG. 6 is an embodiment of an example plot illustrating different tradeoffs between join time and initial bitrate optimized for three different viewers, Alice, Bob, and Charlie. In this example, the three viewers, Alice, Bob, and Charlie, have the same bandwidth (1000 Kbps) and buffer time (10 seconds). In this example, graph line/curve 602 corresponds to graph line/curve 502 of FIG. 5.

The optimal tradeoff ranges for each of Alice, Bob, and Charlie are shown respectively at 604, 606, and 608. The tradeoff points/ranges on curve 602 for Alice, Bob, and Charlie are determined based on their respective profiles and corresponding preferences (e.g., as determined at 404 of FIG. 4A).

For example, suppose that based on an evaluation of Alice's reactions to certain viewing experiences, Alice has been profiled as impatient. Impatient viewers have the video playback preference of preferring a short join time. Thus, Alice's optimal set of points on the curve (604) are skewed towards lower join times, which correspond to lower initial bitrates. As Alice has been profiled as impatient, the initial bitrate control parameter selected for her will be a lower one that reduces join time.

In this example, Bob has been profiled as a perfectionistic who has a preference for high video quality. Thus, Bob's optimal range of points (606) on the join time vs. bitrate curve is skewed towards higher bitrates. Although this will result in longer join times, higher bitrates will be determined as control parameters for Bob so that he can have the high video quality that he prefers.

In this example, Charlie has been profiled as someone that is both impatient and a perfectionistic, who prefers both short join times and high video quality. As Charlie wants both a short join time and a high video quality, a compromise is made on the tradeoff curve in which Charlie's optimal range of bitrates (608) is in the middle of the curve, where bitrate and join time are balanced (where bitrate is not favored over join time, and vice versa). The optimal range of bitrates for each viewer can be specified by a minimum bitrate (e.g., 610) and a maximum bitrate (e.g., 612).

Discovering an Optimal Tradeoff Point for a Viewer

As described above, historical information associated with a viewer's experience and their reactions to those experiences are used as training data to model a viewer's behavior and determine/discover their preferences for video playback.

The viewing experiences that the viewer experiences are influenced by the control parameters used to deliver the content in those viewing experiences, such as different bitrates and/or CDNs. The different bitrates and/or CDNs will determine, for example, the join time of the viewer (e.g., where join time is a measure that makes up a part of the viewing experience), as described above in the example use case above.

For each of those viewing attempts/sessions and their corresponding viewing experiences, the corresponding reactions of the viewer to those viewing experiences for that session are evaluated to determine whether the selection of bitrate and/or CDN for that session/attempt resulted in reactions that indicated positive engagement or negative engagement. The measure of the viewer's engagement is based on the viewer's actions and how those actions were made in the context of the viewing experience. Such viewing experience and corresponding reaction information is used to determine an optimal set of instructions (e.g., converge over time on an optimal bitrate, CDN, rate of switching, etc.) for the viewer's subsequent sessions.

For example, if the viewer quits before a join, then it is inferred that the join time for that session was too long. Based on the viewer's reaction to the viewing experience, a backend such as CDC 300 of FIG. 3 determines that for a next session, this particular viewer should be started at a lower bitrate, which will result in a shorter join time (e.g., as described in equation 4 above).

If the viewer's reaction is to quit soon after a join without buffering, then it is inferred that the bitrate was too low. Thus, the next time that the viewer attempts a session, the viewer will be given a higher initial bitrate to start with as a control parameter.

As another example, if the viewer stays on after a join, that it is inferred that an optimal control parameter point has been found for this viewer. For example, the bitrate selected for the viewer has been determined to be optimal for this viewer, as they have remained engaged (e.g., stayed watching the video).

Figure 7:
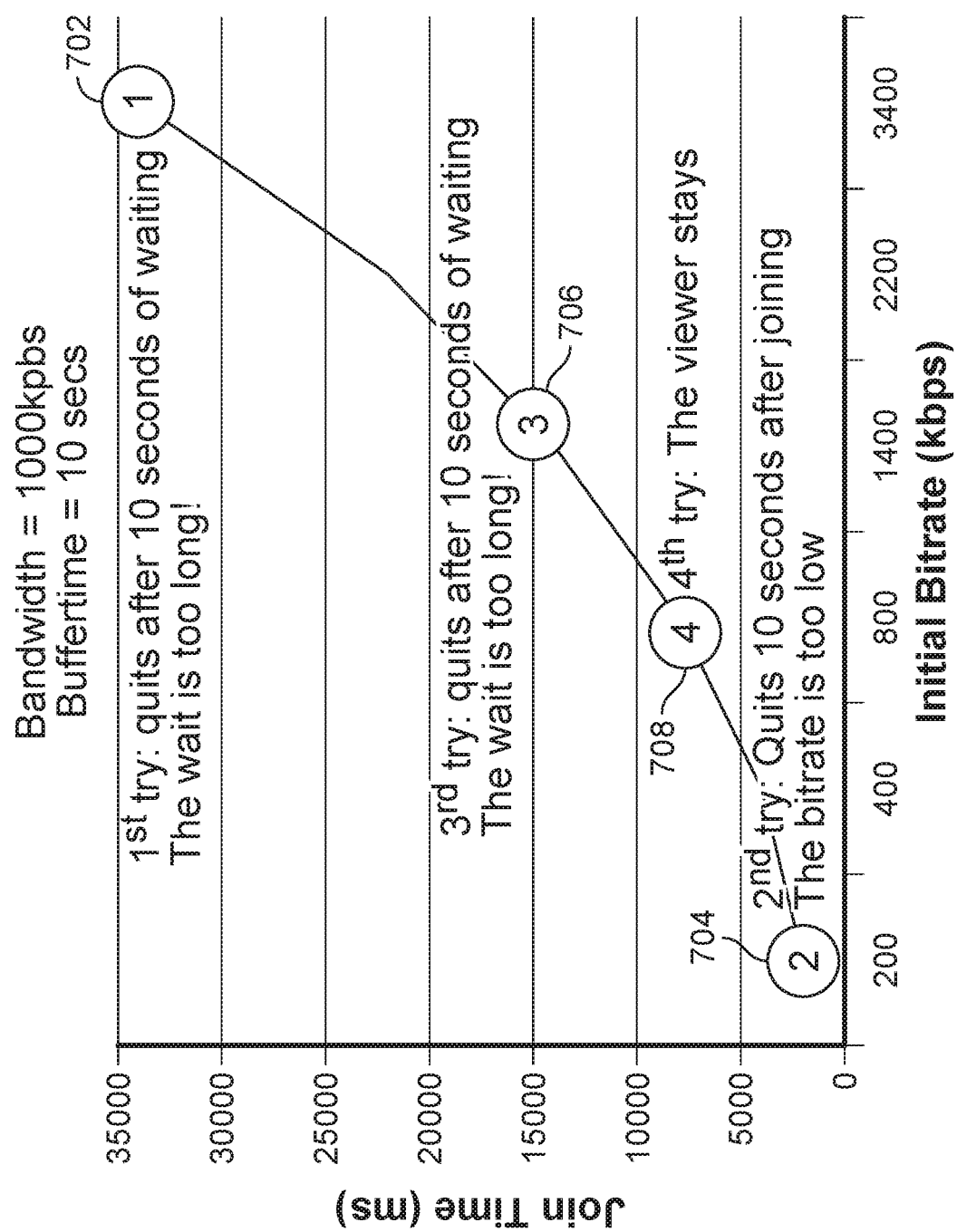
FIG. 7 is an example embodiment of a plot illustrating optimal control parameter discovery for a viewer.

FIG. 7 is an example embodiment of a plot illustrating optimal control parameter discovery for a viewer. In this example, a new viewer's behavior and preferences (e.g., optimal control parameter such as bitrate and/or CDN) are learned by a prediction model using data obtained over four viewing attempts/sessions. The viewer's optimal bitrate is determined based on the viewer's reactions (e.g., quitting or staying) with respect to join time (e.g., actions taken before or after join time). In this example, the prediction model uses a binary search to converge on an optimal bitrate for the viewer. In this example, the client's bandwidth is 1000 Kbps, and the player buffer time is 10 seconds.

The measures associated with the viewer's first viewing experience is shown at 702. As this viewer is a new viewer for which no data is available, for the viewer's first viewing session, a model used to predict an optimal initial bitrate (or any other appropriate control parameter) for the viewer provides an initial bitrate of 3400 Kbps, the highest available bitrate at which the content is encoded. The initial 3400 Kbps bitrate translates (e.g., according to equation 4, above) to a join time of ~34 seconds. Based on the information about the viewer's actions (e.g., collected by a monitoring engine 206 of client 200), it is observed that the viewer quit the streaming session after ten seconds of waiting. Thus, in this case, the viewer has quit the session before being able to join the stream (e.g., before the join time for that given initial bitrate is met). Based on the viewer's engagement action (quitting) in response to their experience of having to wait for content to load, the viewer can be profiled as being potentially impatient, and it is inferred that the initial bitrate provided for this viewer was too high resulting in a wait that was too long for the viewer. Thus, based on an evaluation of the viewing experience and reaction data collected for this first viewing session, the prediction model determines that the highest available bitrate of 3400 Kbps was not optimal for the viewer.

Thus, for the next session, the client's behavior is further probed by the model, which provides content at the lowest available bitrate, 200 Kbps. The measurements associated with this second viewing attempt are shown at 704. In this example, the viewer quit ten seconds after joining. Thus, it is inferred that the viewer quit because the bitrate was too low, and that the viewer is not tolerant of very low bitrates. Thus, based on the information obtained from the two viewing attempts by the viewer, the viewer's profile can be updated to reflect that the viewer is impatient, but is also selective about bitrate. In this example, a model used to predict an optimal initial bitrate for the viewer has used the training data for the first two sessions to determine that the maximum and minimum bitrates are not accurate predictions for the viewer.

Thus, for the next session, the viewer is provided content at a bitrate that strikes a balance with respect to join time. The model, which in this example is performing a binary search, selects a bitrate that is closest to the average of lowest and highest available bitrates as the control parameter for the viewer's third viewing attempt. The information associated with this third viewing session is shown at 706. In this example, the viewer once again quit after ten seconds of waiting. As the wait time is less than the join time, it is inferred that the viewer was still kept waiting too long, and that the chosen bitrate for this third session was too high, resulting in a join time that was too high for this viewer.

For the fourth session, based on an evaluation of the viewer's past historical viewing experience and reaction information for the previous three sessions, the model continues the binary search, in this case selecting the bitrate that is halfway between the bitrate of the second attempt and the third attempt (as the bitrate of the second attempt was too low, and the bitrate of the third attempt was too high). The bitrate and join time for this fourth attempt is shown at 708. For this viewing session experience, with the bitrate selected, the viewer stayed with the stream (i.e., remained engaged with the stream). Thus, based on the viewer's reaction (e.g., staying with the stream) to the viewing experience (e.g., of having the stream provided at an initial bitrate of ~800 Kbps), the model has learned that an optimal bitrate for this viewer has been found. For future, subsequent sessions, the viewer will be provided content at or around this optimal bitrate.

As shown in the example above, data collected about the viewer's viewing experiences and reaction information over multiple sessions is used as training data to train a model of the viewer's behavior with respect to different bitrates (and resulting join times). As more data is collected and used to train the model, the accuracy of the predictions/estimates (i.e., of optimal control parameters such as bitrate, CDN, switching rate, etc.) for the viewer is increased/improved. Thus, control parameters can be determined that are tailored/personalized to the viewer's learned preferences such that the viewer's playback experience and engagement are improved. In the example above, the tradeoff between the dimensions of join time and bitrate were explored by the model, wherein an optimal tradeoff between join time and bitrate was determined for the viewer. Tradeoffs between other dimensions, such as buffer time, can also be considered. For example, the three-dimensional tradeoff between buffer time, join time, and initial bitrate can be determined by the model. Any combination of two of the three tradeoffs can also be determined as well.

In the example above, the model used only the viewer's own data to develop the viewer's personalized model. Thus, for the first attempt, the model did not yet have any sample data for the viewer, and the model provided a maximum bitrate in order to probe for the viewer's reactions and begin the training process. As described above, global information from other clients can be used to facilitate and expedite the training process.

For example, in the first attempt for a new viewer, rather than selecting the upper bound bitrate, the optimal initial bitrates determined for other viewers similar to the new viewer are obtained. Those obtained optimal initial bitrates for those other viewers are then combined to determine a starting bitrate for this first session with the new viewer. For example, the average of the (currently predicted) optimal bitrates for other viewers is used as the starting bitrate for the new viewer's session.

The personalized model for the new viewer can then use this starting bitrate determined from aggregate information associated with other similar or otherwise correlated to viewers as a baseline from which further viewing experience and reaction information is used refine and improve the model's accuracy. Over time, as more samples of the new viewer's own personalized information are obtained and evaluated, the model becomes trained to be more personalized to provide more accurate results for the new viewer.

Optimal Tradeoff Point Based on Content Type

Viewers may have different behavior profiles based on different contexts. For example, the same person may have different preferences to different content types. As one example, the viewer may favor low join times with respect to news content, favor high bitrates when it comes to movies/episodic content, and for live sports, favor low join times and quick switch ups.

Figure 8:
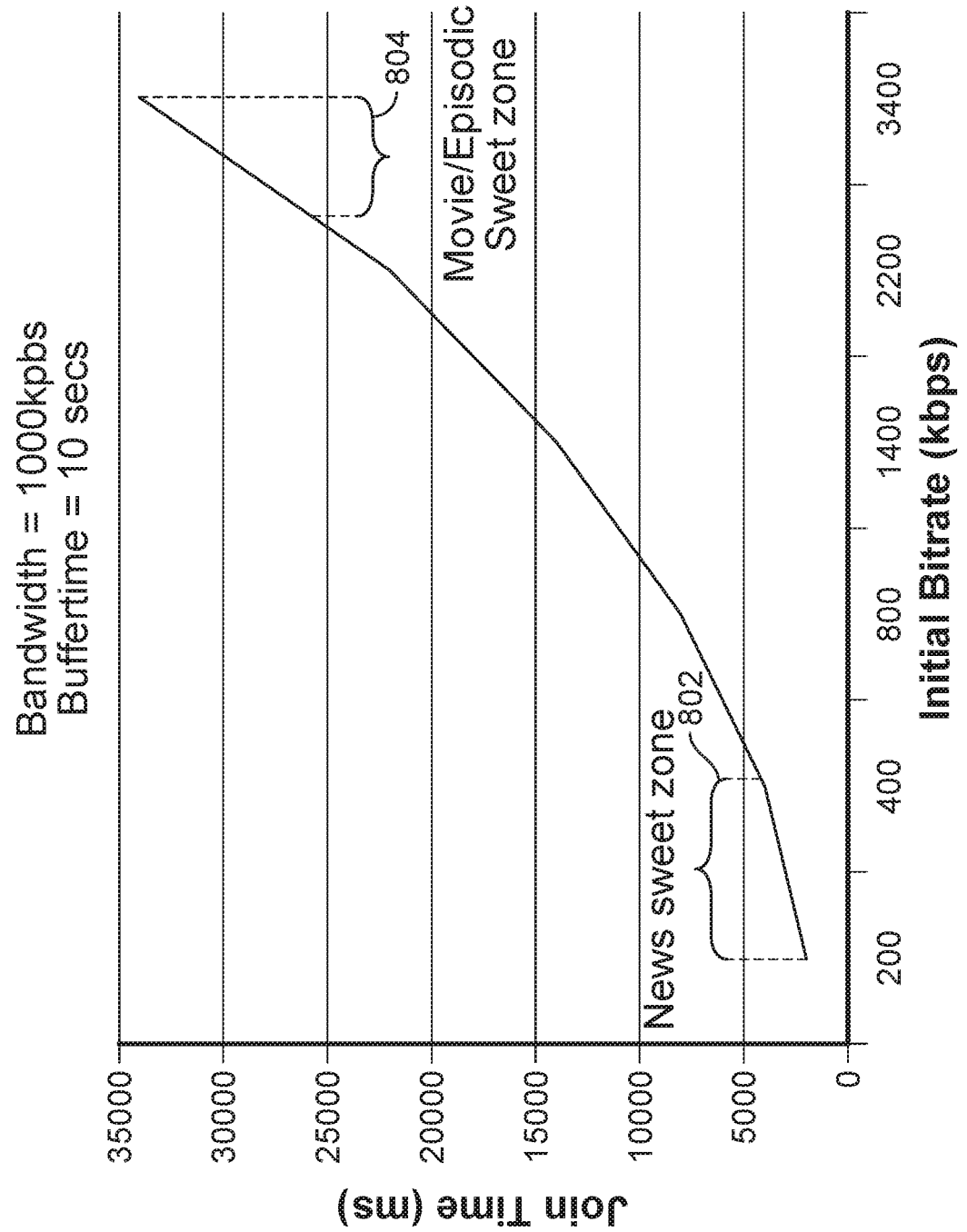
FIG. 8 is an embodiment of a plot illustrating a same viewer's optimal bitrate/join time ranges for different types of content.

FIG. 8 is an embodiment of a plot illustrating a same viewer's optimal bitrate/join time ranges for different types of content. In this example, the viewer's optimal bitrate/join time for movie/episodic content is shown at 804, where the viewer favors high quality (high bitrates). 802 illustrates the optimal bitrate/join time tradeoff for the viewer for news content, where because the viewer prefers low join times, the viewer will be provided with lower bitrates that result in faster join times with respect to news content type, such that the viewer does not have to wait long to watch the news content. For example, because the viewer's content has metadata describing its content type, the model associated with the viewer has learned, over time, that when watching news content, the viewer has stayed with the stream, even though the bitrate was low. Because low bitrates may translate to more pixilation and lower video bitrate (and are typically viewed as less favorable compared to high video bitrate), the viewer's willingness to stay engaged with the stream can be inferred to be indicative of the viewer's preference for shorter join times (as they are willing to stay even at the expense of lower video quality).

Thus, the same viewer may have different profiles that are differentiated based on content type.

In addition to, or instead of content type, viewers may have behavior profiles and models that are differentiated by and tailored to other factors, such as content length, device type, ISP, etc. (or any combination of the factors). When using global optimization, for example, a viewer can be classified according to such factors/characteristics/attributes/dimensions when determining other similar views/viewers whose information can be used to predict/estimate optimal control parameters and optimization algorithms for the viewer.

Client-Side Per-Viewer Engagement-Based Video Optimization

In some embodiments, the per-viewer engagement-based video optimization is performed locally at the client.

Figure 9:
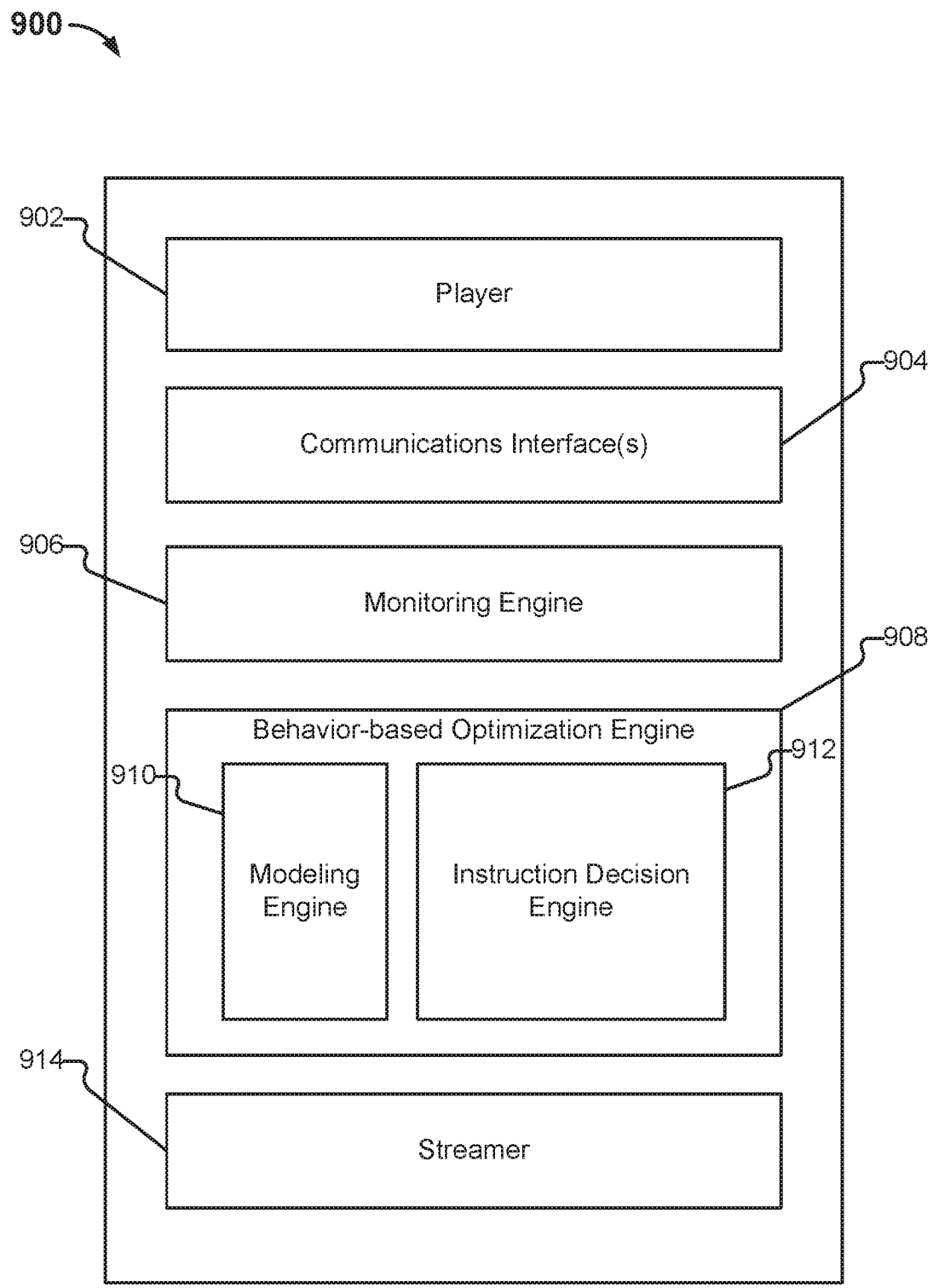
FIG. 9 is a block diagram illustrating an embodiment of a client.

FIG. 9 is a block diagram illustrating an embodiment of a client. In this example, client 900 includes player 902, communications interface(s) 904, monitoring engine 906, behavior-based optimization engine 908, and streamer 914. Behavior-based optimization engine 908 further includes modeling engine 910 and instruction decision engine 912.

In this example, player 902, communications interface(s) 904, monitoring engine 906, and streamer 914 are configured with functionality similar to player 202, communications interface(s) 204, monitoring engine 206, and streamer 208 of FIG. 2, respectively. In some embodiments, behavior-based optimization engine 908 is configured to provide, locally at the client device, functionality similar to that of behavior-based optimization engine 304 of FIG. 3. In some embodiments, some or all of components 904-912 are incorporated in player 902 (e.g., as components of a client video player application).

In this example client, rather than sending user behavior information (e.g., viewing habits, viewing experience and reaction information, etc.) collected by the monitoring engine to a backend such as CDC 300 of FIG. 3, the user behavior information is instead sent to behavior-based optimization engine 908, which is resident on local client device 900. In some embodiments, the local user behavior information monitored by monitoring engine 906 is stored locally at the client (e.g., in a local storage such as a database). The user behavior information (as well as client performance information) can also be sent to a backend such as CDC 300 of FIG. 3, which is configured to aggregate information from numerous clients to determine a global view of viewer performance and preferences/behaviors.

The behavior-based optimization engine 908 is configured to evaluate, locally at the client, the viewer's experience and reactions to learn the viewer's preferences. The behavior optimization is performed using techniques similar to those described in conjunction with behavior-based optimization engine 304 of FIG. 3. For example, using locally collected behavior information, modeling engine 306 generates a model of the viewer. Generating the profile includes classifying the viewer and/or training a model that is used to predict the preferences for the viewer (e.g., using machine learning algorithms). The profile is then used by instruction decision engine 912 to select a set of appropriate viewing experience algorithms that are tuned for the learned behavior and preferences of the viewer. The viewing experience algorithms are configured to determine an optimal set of control parameters (e.g., bitrate, CDN, switching rate, etc.) that are optimal given the learned/modeled behavior/preferences of the viewer. The determination is made for the start of a session and/or throughout the duration of the session.

In some embodiments, behavior-based optimization engine 908 is configured to obtain global information from a backend such as CDC 300 of FIG. 3. As similarly described in conjunction with behavior-based optimization engine 304 of FIG. 3, the global information associated with other clients/viewers/views determined to be similar to the active viewer using the local client device can be used to supplement the local viewer behavior information to facilitate the selection/prediction/estimation of appropriate view experience algorithms and control parameters. The global information can be requested, for example, via heartbeats sent by the client to a backend such as CDC 300 of FIG. 3, which is configured to perform (e.g., via global optimization engine 318 of FIG. 3) aggregation and evaluation of global information. In some embodiments, the viewer's behavior profile and video playback preferences are stored locally to a local data storage (e.g., local database).

The control parameters determined by behavior-based optimization engine 908 are then used by the client to obtain content (e.g., content is obtained according to the optimal bitrate, CDN, bitrate switching rate, etc. determined by the behavior-based optimization engine). In some embodiments, real-time performance information can also be obtained to augment/refine the behavior-based optimization decision. For example, a real-time performance-based optimization decision for the viewer/client/view can be requested by the client from a backend such as CDC 300 of FIG. 3, which is configured to perform (e.g., via performance optimization engine 312 of FIG. 3) real-time performance-based optimization of streaming decisions.

Figure 10:
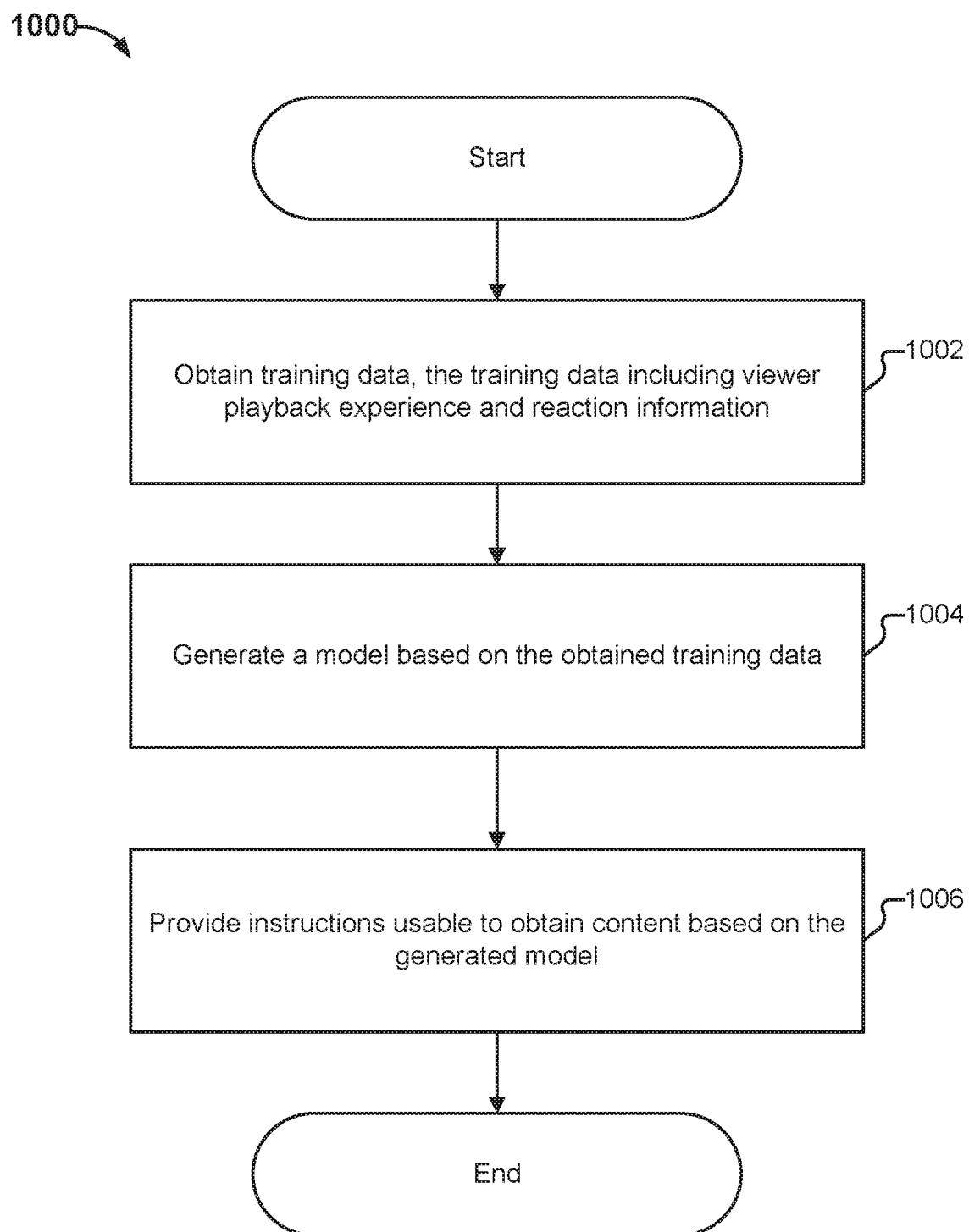
FIG. 10 is a flow diagram illustrating an embodiment of a process for per-viewer engagement-based video optimization.

FIG. 10 is a flow diagram illustrating an embodiment of a process for per-viewer engagement-based video optimization. In some embodiments, process 1000 is executed by client 900 of FIG. 9. The process begins at 1002 when training data is obtained. The training data includes viewing experience and reaction information, such as that described above. The training data includes viewing experience/reaction information collected locally at the device, and/or data from other viewers. In some embodiments, the data associated with the viewer using the device is maintained locally on the device, and is obtained from local storage. The data associated with other viewers (e.g., those that are similar to the requesting viewer) is requested from a backend that is provided by a backend such as CDC 300 of FIG. 3 (which is configured to maintain global information). Local storage of per-viewer information may provide benefits with respect to privacy.

At 1004, a model is generated for the active viewer of the client device based on the obtained training data. Similar to the descriptions in processes 400 and 450 of FIGS. 4A and 4B, respectively, the training data associated with the active viewer and/or similar viewers (i.e., local and/or global information) is used to generate a model for the active viewer. In some embodiments, the model is generated and stored locally at the client device.

At 1006, instructions usable to obtain content are provided based on the generated model. For example, similar to the descriptions in process 400 of FIG. 4A, the locally generated model is used to estimate an optimal set of control parameters and algorithms (e.g., for determining bitrate, CDN, switching rate, etc.) that will maximize the active viewer's engagement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    receive a request for content associated with a current streaming session;
    determine that a viewer associated with the current streaming session is a new viewer;

in response to determining that the viewer associated with the current streaming session is a new viewer, classify the new viewer;

based at least in part on the classification, identify a set of other viewers similar to the new viewer;

based at least in part on historical reactions of the identified set of other viewers with respect to viewing experiences associated with previous streaming sessions, predict optimal initial bitrates for the identified set of other viewers; and combine the optimal initial bitrates predicted for the identified set of other viewers to determine a starting bitrate for the current streaming session associated with the new viewer; and a memory coupled to the processor and configured to provide the processor with instructions.

2. The system recited in claim 1, wherein viewing experience information associated with a previous streaming session comprises at least one of an initial bitrate, an initial content delivery network (CDN), a player buffer size, download speed, and an amount of time before content began playing during the previous streaming session.

3. The system recited in claim 2, wherein information associated with a historical viewer reaction with respect to a viewing experience associated with the previous streaming session comprises one or more indications of viewer engagement with respect to the previous streaming session.

4. The system recited in claim 3, wherein the one or more indications of viewer engagement comprise at least one of an indication of whether a viewer quit the previous streaming session, an amount of time before the viewer returned to viewing content that they quit, an indication of whether the viewer restarted viewing of the content, an indication of whether the viewer quit the previous streaming session to view another content item, an indication of whether the viewer paused or fast forwarded the content, and an indication of whether the viewer quit before the content started playing.

5. The system recited in claim 1, wherein the new viewer is classified based at least in part on a set of attributes comprising one or more of the content being requested, a type of the content, a client device type, network conditions, publisher, a website from which the request was made, a referred website, and a geographic region associated with a client device on which the current streaming session was initiated.

6. The system recited in claim 1, wherein the processor is further configured to use the historical reactions of the identified set of other viewers with respect to viewing experiences associated with the previous streaming sessions to generate a model of the new viewer, wherein the model comprises a model of the new viewer's behaviors and preferences, and wherein the model is used to determine the starting bitrate for the current streaming session for the new viewer.

7. The system recited in claim 6, wherein the processor is further configured to establish a record for the new viewer and store the model generated for the new viewer to the established record.

8. The system recited in claim 6, wherein the processor is configured to collect viewing experience and reaction information for the current streaming session, and wherein the model is updated based at least in part on the viewing experience and reaction information collected for the current streaming session.

9. The system recited in claim 6, wherein a plurality of models is generated for the new viewer, and wherein each model in the plurality of models corresponds to a different type of content.

10. A method, comprising:

receiving a request for content associated with a current streaming session;

determining that a viewer associated with the current streaming session is a new viewer;

in response to determining that the viewer associated with the current streaming session is a new viewer, classifying the new viewer;

based at least in part on the classification, identifying a set of other viewers similar to the new viewer;

based at least in part on historical reactions of the identified set of other viewers with respect to viewing experiences associated with previous streaming sessions, predicting optimal initial bitrates for the identified set of other viewers; and combining the optimal initial bitrates predicted for the identified set of other viewers to determine a starting bitrate for the current streaming session associated with the new viewer.

11. The method of claim 10, wherein viewing experience information associated with a previous streaming session comprises at least one of an initial bitrate, an initial content delivery network (CDN), a player buffer size, download speed, and an amount of time before content began playing during the previous streaming session.

12. The method of claim 11, wherein information associated with a historical viewer reaction with respect to a viewing experience associated with the previous streaming session comprises one or more indications of viewer engagement with respect to the previous streaming session.

13. The method of claim 12, wherein the one or more indications of viewer engagement comprise at least one of an indication of whether a viewer quit the previous streaming session, an amount of time before the viewer returned to viewing content that they quit, an indication of whether the viewer restarted viewing of the content, an indication of whether the viewer quit the previous streaming session to view another content item, an indication of whether the viewer paused or fast forwarded the content, and an indication of whether the viewer quit before the content started playing.

14. The method of claim 10, wherein the new viewer is classified based at least in part on a set of attributes comprising one or more of the content being requested, a type of the content, a client device type, network conditions, publisher, a website from which the request was made, a referred website, and a geographic region associated with a client device on which the current streaming session was initiated.

15. The method of claim 10, further comprising using the historical reactions of the identified set of other viewers with respect to viewing experiences associated with the previous streaming sessions to generate a model of the new viewer, wherein the model comprises a model of the new viewer's behaviors and preferences, and wherein the model is used to determine the starting bitrate for the current streaming session for the new viewer.

16. The method of claim 15, further comprising establishing a record for the new viewer and storing the model generated for the new viewer to the established record.

17. The method of claim 15, further comprising collecting viewing experience and reaction information for the current streaming session, and wherein the model is updated based at least in part on the viewing experience and reaction information collected for the current streaming session.

18. The method of claim 15, wherein a plurality of models is generated for the new viewer, and wherein each model in the plurality of models corresponds to a different type of content.

19. A computer program product embodied in a non-transitory computer readable storage medium and comprising computer instructions for:
- receiving a request for content associated with a current streaming session;
- determining that a viewer associated with the current streaming session is a new viewer;
- in response to determining that the viewer associated with the current streaming session is a new viewer, classifying the new viewer;
- based at least in part on the classification, identifying a set of other viewers similar to the new viewer;
- based at least in part on historical reactions of the identified set of other viewers with respect to viewing experiences associated with previous streaming sessions, predicting optimal initial bitrates for the identified set of other viewers; and
- combining the optimal initial bitrates predicted for the identified set of other viewers to determine a starting bitrate for the current streaming session associated with the new viewer.

* * * * *